US012793565B2

(12) United States Patent
Porsborg et al.

(10) Patent No.: US 12,793,565 B2
(45) Date of Patent: Nov. 10, 2026

(54) SYSTEMS, METHODS, AND PROCESSES FOR MACHINERY EVALUATION

(71) Applicant: SAG LLC, Minot, ND (US)

(72) Inventors: Andrew Jon Porsborg, Minot, ND (US); Jillian M. Coppin, Fargo, ND (US); Stewart Jason Opland, Williston, ND (US); Samuel Jacob Spradley, New England, ND (US)

(73) Assignee: SAG LLC, Minot, ND (US)

(*) Notice: Subject to any disclaimer, the term of this patent is extended or adjusted under 35 U.S.C. 154(b) by 168 days.

(21) Appl. No.: 18/768,966

(22) Filed: Jul. 10, 2024

(65) Prior Publication Data

US 2025/0022382 A1 Jan. 16, 2025

Related U.S. Application Data

(60) Provisional application No. 63/525,846, filed on Jul. 10, 2023.

(51) Int. Cl.

| | |
|---|---|
| ***G09B 5/02*** | (2006.01) |
| ***G06N 20/00*** | (2019.01) |
| ***G06T 11/00*** | (2026.01) |
| ***G07C 5/10*** | (2006.01) |

(52) U.S. Cl.

CPC ............... *G09B 5/02* (2013.01); *G06N 20/00* (2019.01); *G06T 11/00* (2013.01); *G07C 5/10* (2013.01); *G06T 2200/24* (2013.01)

(58) Field of Classification Search

CPC .......... G09B 5/02; G06N 20/00; G06T 11/00; G06T 2200/24; G07C 5/10

See application file for complete search history.

(56) References Cited

U.S. PATENT DOCUMENTS

| | | | |
|---|---|---|---|
| 10,217,066 | B1 | 2/2019 | Margherio et al. |
| 10,540,618 | B2 | 1/2020 | Margherio et al. |
| 11,017,321 | B1 | 5/2021 | Mishra et al. |

(Continued)

OTHER PUBLICATIONS

International Search Report and Written Opinion in International Appln. No. PCT/US2024/037390, mailed Sep. 27, 2024, 20 pages.

*Primary Examiner* — Said Broome
*Assistant Examiner* — Jordan Wan Yick
(74) *Attorney, Agent, or Firm* — Fish & Richardson P.C.

(57) ABSTRACT

This document provides systems, methods, and processes for determining an evaluation of a machine. An example method performed by one or more computers, can include receiving, from a database, input data corresponding to an agricultural machine; determining, from the input data, a plurality of attributes that is associated with a respective characteristic or component of the agricultural machine; determining, by a machine learning model, an evaluation of the agricultural machine by applying a set of parameters of the machine learning model on the plurality of attributes, wherein the evaluation includes a prediction regarding respective repairs or maintenances of one or more components of the agricultural machine; and displaying an extended reality representation of the evaluation on a user interface, the extended reality representation including one or more user interface indicators that each represents performing a respective predicted repair or maintenance of the one or more components of the agricultural machine.

18 Claims, 28 Drawing Sheets

(56) References Cited

U.S. PATENT DOCUMENTS

| | | | | |
|---|---|---|---|---|
| 11,587,315 | B2 | 2/2023 | Gilbert et al. | |
| 12,056,965 | B1 * | 8/2024 | Marlow | G06V 20/56 |
| 2008/0082345 | A1 | 4/2008 | Greiner et al. | |
| 2016/0098637 | A1 | 4/2016 | Hodel et al. | |
| 2017/0018012 | A1 | 1/2017 | Shinohara et al. | |
| 2018/0239948 | A1 | 8/2018 | Rutschman et al. | |
| 2018/0320658 | A1 | 11/2018 | Herzog et al. | |
| 2021/0142395 | A1 | 5/2021 | Fujima et al. | |
| 2021/0342790 | A1 * | 11/2021 | Dagley | G06T 11/60 |
| 2022/0076213 | A1 | 3/2022 | Dagley et al. | |
| 2022/0139117 | A1 | 5/2022 | Zhang et al. | |
| 2022/0198642 | A1 * | 6/2022 | Sharma | G06N 20/00 |
| 2023/0064656 | A1 | 3/2023 | Shrivastav et al. | |
| 2024/0169601 | A1 * | 5/2024 | Finley | G08B 21/0484 |

* cited by examiner

906

912

904

SYSTEMS, METHODS, AND PROCESSES FOR MACHINERY EVALUATION

CROSS-REFERENCE TO RELATED APPLICATION

This application claims the benefit of U.S. Provisional Application No. 63/525,846 filed Jul. 10, 2023, the disclosure of which is incorporated herein by reference in its entirety.

TECHNICAL FIELD

This document relates to systems, methods, and processes for machinery evaluation. For example, this document provides systems, methods, and processes for machinery evaluation using trained machine learning models.

BACKGROUND INFORMATION

Tracking and maintaining machinery maintenance regularly is important to prolong the lifespan of the machinery and to receive an optimal performance. Regular maintenance and repairs help identify and address potential issues before they escalate into major problems, reducing the risk of unexpected breakdowns and costly repairs. By adhering to a tracking system or a maintenance schedule, businesses can minimize downtime, maximize productivity, and ultimately save significant time and money.

SUMMARY

This document provides systems, methods, and processes for evaluation of an equipment, vehicle, or machine, for example, heavy machinery, such as an agricultural machine, mining equipment, forestry equipment, construction equipment, using machine learning models. Contextual variables that affect the machine can have a significant impact on the maintenance and life of the respective the machine. For example, the context of how a respective machine is used, the material (e.g., metal, stone, wood, earth, plants, water, etc.) it operated to manipulate, the terrain, the geographical region of use, current or recent inspections, and/or past work order history can impact the maintenance and repair needs, for example, beyond a manufacturers recommendation which does not include such context.

Contextual variables that affect a machine, such as agricultural machinery can have a significant impact on the maintenance and life of the machine. Such contextual variables can include work history of the machine, which is not considered in prior art predictive vehicle and equipment maintenance models. The improved systems, methods, and processes for evaluations presented in this document aims to address these problems that remain unmet by prior art. While this disclosure focuses on agricultural machineries, similar concepts can be applied to other vehicles, or machines, particularly heavy vehicles such as construction machineries, aviation machineries, transportation vehicles, etc., without deviating from the main ideas described herein.

In some implementations, the evaluation of agricultural machines includes predictive information about maintenance suggestions to repair, run (e.g., continue to operate), sell, or replace a particular piece of agricultural equipment (e.g., a particular piece of agricultural machinery). The improved trained machine learning models described herein can predict current or future repair needs for agricultural machines by considering input data that includes context of machine use or work history. The context of machine use can include a specific crop type, past work orders, past repairs performed on the agricultural machine, make, model, hours of use, acres of crop harvested, bushels of crop harvested, and/or geographic information. This allows operators to anticipate the potential stresses imposed on the machine during operation and make curated informed decisions such as repairs, adjustment to maintenance schedules, prioritize inspections of components, decisions regarding the cost/benefit of repairing vs. replacement, and, allocation of resources.

Performance metrics of agricultural machinery can vary greatly based on context in which the machine is used. For example, different crops exhibit varying characteristics such as plant density, stem thickness, harvesting methods, and geographical location which can influence the wear and tear experienced by the machine.

For example, a combine harvester used to harvest a dense crop with thick stems and tightly packed vegetation will experience wear on components that would not necessarily be comparable to a wear resulting from harvesting harvest a relatively lighter crop with thinner stems and a relatively lower plant density. With this example, additional context such as hours of use, acres of crop harvested, and past repair history can impact the wear and tear of the combine harvester used to harvest a dense crop differently than the combine harvester used to harvest the lighter crop. The improved trained machine learning models described herein utilize a comprehensive contextual proactive approach that takes into account the nuances of crop-specific wear and tear, actual work order data and geography ensuring that the piece of agricultural machinery remains in optimal working condition, reducing (e.g., minimizing) downtime, and increasing (e.g., maximizing) overall productivity.

The techniques, ideas, and embodiments described in this disclosure allow users to take control of the maintenance of their equipment and machinery, and reduce the down time resulting from having the equipment or machinery in a repair shop. As presented herein, a user can use an input device (e.g., a scanner device) to input the information of their machinery into a computing system, and receive repair or maintenance recommendations from the system. The farmer can follow the system's instructions to perform repair or maintenance of the machinery. As discussed further below, the instructions can be presented to the farmer on a display device, e.g., a tablet, an extended reality goggle, etc. Users that use such system can proactively repair or maintain their machineries, to improve the health and lifetime of their machineries and reduce the chance of their machineries breaking down particularly during times of prolonged use, e.g., planting, harvesting, etc.

Some embodiments of the methods, systems, and processes described herein can provide one or more of the following advantages. First some embodiments described herein disclose systems, methods, and processes to provide individualized predictive agricultural machinery evaluations that consider attributes that include use context specific to a respective agricultural machine (e.g., geographical region, terrain type, and a type and an amount of crops harvested.) The improved machine learning models described herein determine one or more attributes to account for these contextual factors that can impact the maintenance needs of agricultural machinery beyond what can be gleaned from manufactures recommendations and traditional inspections. The improved machine learning model described herein enable more accurate predictions tailored to the specific conditions in which the agricultural machinery operates.

Second, some embodiments described herein disclose systems, methods, and processes to provide predictive agricultural machinery evaluations using improved machine learning models that incorporate several attributes identified from real work order data in training and/or inference of the machine learning model. For example, historical real work order data about a particular piece of agricultural machinery can be dissected to identify several attributes about the particular piece of agricultural machinery. The attributes can be labeled as corresponding to the particular piece of agricultural machinery and used to train the machine learning model. Such training produces a trained machine learning model that benefits from actual maintenance records, providing insights into the actual issues and patterns observed in the field. This allows for a fine-tuned predictive evaluation of maintenance requirements based on real-world data. The records used for training the model include, but is not limited to communications (e.g., emails) about respective machineries (e.g., about sales, repairs, repair recommendations, etc.), business transactions, operator or technician manuals, etc.

Third, some embodiments described herein disclose systems, methods, and processes to provide predictive agricultural machinery evaluations using improved machine learning models enhance the accuracy and relevance of the agricultural machinery evaluations by considering attributes that include contextual information (e.g., real work order data) about the machinery. This can result in customized maintenance recommendations for agricultural machinery. For example, a predictive evaluation generated by the improved machine learning models described herein can provide a user with a relevant list of repair tasks and associated parts that are based on the context (e.g., crops, geography, past work order history, past use history, etc.) in which the specific agricultural machine is used.

Fourth, some embodiments described herein disclose systems, methods, and processes to provide predictive agricultural machinery evaluations using improved machine learning models improve accuracy of lifespan predictions of agricultural machinery. For example, previously unattainable predicative information can provide options to a user that can assist in decisions to replace, run, or repair a piece of agricultural machinery. The improved machine learning models described herein take into account factors such as geographical region of use, crop type harvested, actual work order data, and terrain type, to generate a predictive evaluation for the piece of agricultural machinery. In some embodiments, by identifying that a piece of agricultural machinery has a limited remaining lifespan in its current use context, the improved machine learning model can recommend a cost-effective alternative. Non-limiting examples of cost-effective alternatives include recovering cost by selling the piece of agricultural machinery for a different use context (e.g., different geographical region or a harvesting a different crop), or extending the lifespan by repurposing the piece of agricultural machinery for a different use context (e.g., different geographical region or a different crop). This recommendation can help reduce (e.g., minimize) maintenance and/or replacement costs and potentially provides an opportunity for cost recovery through the sale of the piece of agricultural machinery.

An accurate lifespan prediction of agricultural machinery can be used for resale purposes. For example, the improved machine learning model described herein can be implemented by a user who sells agricultural machinery to provide a more informed decision-making process by considering various contextual factors. The improved machine learning model described herein goes beyond the generic recommendations based on usage hours and manufacturer guidelines. Specifically, by analyzing real work order data and correlating it with geographical region, terrain information, crop usage information the improved machine learning model provides actionable insights on the economic viability of maintaining a particular piece of agricultural machinery. In this way, a seller can accurately inform a prospective buyer of the capabilities, remaining lifespan, and future repair needs of the particular piece of agricultural machinery.

Fifth, the present disclosure provides a novel technique in presenting the evaluations and/or recommendations that the machine learning model has inferred for agricultural machinery. The technique includes presenting a step-by-step guidance to the user on how to perform an individualized recommended maintenance or repair on the machinery or on a particular component of the machinery. The step-by-step guidance can include displaying figures or user interface indicators that point out to the particular parts of the machinery that are involved in the recommended maintenance or repair. The guidance can be as detailed as showing an animated or a picture of the hand gesture or movement for performing a particular task on the machinery's particular parts. For example, the presentation can be implemented on an extended reality environment, with which the user can interact and proceed through the step-by-step guidance to perform the recommended maintenance or repair.

Sixth, the present disclosure provides novel systems, methods, and processes to provide a diagnosis of a current or a predicted problem with an agricultural machine using improved machine learning models and present an evaluation and/or recommendation for repair. The improved trained machine learning models described herein can consider input data that includes current or recent inspection data in addition to the context of machine use (e.g., a specific crop type, past work orders, past repairs performed on the agricultural machine, make, model, hours of use, acres of crop harvested, bushels of crop harvested, and/or geographic information), and/or work history. For example, the inspection data can include symptoms of a current fault observed from the agricultural machinery. In some embodiments, the symptoms are one or more of information about a noise, a leak, a smell, or an observed operation.

Seventh, the present disclosure provides novel systems, methods, and processes that receive input data from a user pertaining to a diagnostic problem encountered by a user outside of an inspection (e.g., a noise, a leak, a smell, or an observed operation). The improved trained machine learning models described herein can consider the input data from the user and based on current, past, or recent inspection data in addition to the context of machine use (e.g., a specific crop type, past work orders, past repairs performed on the agricultural machine, make, model, hours of use, acres of crop harvested, bushels of crop harvested, and/or geographic information), and/or work history accurately diagnose the cause of the diagnostic problem.

The trained machine learning model can provide an evaluation (e.g., predictive evaluation) of the agricultural machinery that can include a current or a predicted cause of the current or a future fault, and one or more recommendations associated with the fault. In some embodiments, the evaluation includes customized recommendation to associated with the fault (e.g., repair the fault). For example, a relevant list of repair tasks, a relevant list of parts to accomplish the repair or maintenance, a step-by-step guidance to perform the recommended maintenance or repair, a predicted cost to repair the fault and run the equipment, a predicted lifespan if the fault is repaired, a predicted replacement cost of the agricultural machine, and/or a predicted sale cost of the agricultural machine.

In case of identifying multiple maintenance or repair tasks to be recommended for the machinery, the system can also priorities the tasks, and display the tasks to the user in the order of their priority. The user can review the tasks one by one or as a group, and can select just a few (e.g., one, or two most important tasks) or all of the recommended tasks. As a result of such selection, the system provides the details of each task by presenting the step-by-step guidance discussed above. Such presentation can be done, e.g., based on the priority order of the selected tasks.

In one aspect, this disclosure disclose features a method that includes receiving, from a database, input data corresponding to, a machine, e.g., an agricultural machine, determining, from the input data, a plurality of attributes that each is associated with a respective characteristic or component of the agricultural machine, determining, by a machine learning model, an evaluation of the agricultural machine by applying a set of parameters of the machine learning model on the plurality of attributes, where the evaluation includes a prediction regarding respective repairs or maintenances of one or more components of the agricultural machine, and displaying an extended reality representation of the evaluation on a user interface, the extended reality representation including one or more user interface indicators that each represents performing a respective predicted repair or maintenance of the one or more components of the agricultural machine.

In some embodiments, the extended reality representation indicates step-by-step instructions for performing the respective predicted repair or maintenance. In some embodiments, the method further includes training the machine learning model; and transforming a plurality of different training data formats to a format that is acceptable for the machine learning model, where the plurality of attributes include one or more of hours of use, quantity of acreage harvested, make, model, repair history, work order history, quantity of bushels harvested, variety of crop, and geographical region of use.

In some embodiments, the predicted repair or maintenance of the one or more components of the agricultural machine is based on: one or more attributes selected from hours of use, make, and model; and one or more attributes selected from repair history, quantity of bushels harvested, variety of crop, and geographical region of use.

In some embodiments, the machine learning model includes at least one of a neural network, a support vector machine, a classifier, a regression model, a clustering model, a decision tree, a random forest model, a genetic algorithm, a Bayesian model, a Gaussian mixture model, a gradient boosting model, or a dimensionality reduction model.

In some embodiments, the machine learning model has been trained using a plurality of sets of known attributes that correspond to a plurality of known agricultural machines. In some embodiments, the plurality of sets of known attributes include past repair history, quantity of bushels harvested, variety of crop, and geographical region of use.

In some embodiments, the method includes generating an evaluation output that includes one or more of a creation of inspection points on the agricultural machine, a recommendation to run the agricultural machine, a recommendation to replace the agricultural machine, a recommendation to repair the agricultural machine, a prediction of failure probabilities of components on the agricultural machine, a list of parts tailored to the attributes of the agricultural machine, or guidance to support resources, where the extended reality representation includes a representation of the evaluation output.

In some embodiments, the inspection points can include information about a probability that a particular component will fail.

In some embodiments, the displaying the extended reality representation of the evaluation output to a user interface includes a representation of a portion of the agricultural machine that is obscured. In some embodiments, the extended reality is virtual reality or augmented reality. In some embodiments, the input data corresponding to the agricultural machine is obtained from is fiducial marker coupled to the agricultural machine.

In a further aspect, a method for diagnosing and repairing machinery using a repository and a trained machine learning model comprises receiving, on a user device, a request for a recommendation on repair or inspect at least one machinery in a plurality of machineries that are associated with a user of the user device; retrieving, from a database, information associated with the particular piece of machinery; analyzing the retrieved information to obtain attributes associated with the particular piece of machinery; obtaining diagnostic codes or symptoms related to a particular piece of machinery of the plurality of pieces of machinery; determining a recommendation on diagnosis or repair of the particular piece of machinery by running a trained machine learning model on the retrieved attributes; presenting the determined recommendation in a form of a presentation on the user device, where the presentation includes step-by-step instructions for performing a repair or inspection; and updating a repair or inspection history of the particular piece of machinery on the repository based on a response of the user to perform or not perform the repair or inspection.

In some embodiments, the input diagnostic codes or symptoms comprise audio data, visual data, or manually entered data. In some embodiments, the attributes associated with the particular piece of machinery are one or more of hours of use, make, and model of the particular piece of machinery; and one or more of repair history, quantity of harvested crops, particularly the number bushels, variety of crop, and geographical region of use. In some embodiments, the user device includes one or more of a smart device, headset, phone, computer, or tablet. In some embodiments, the step-by-step instructions are provided through an augmented reality interface on the user device. In some embodiments, the method further comprises updating the repository by adding new machinery, removing the particular piece of machinery, or modifying attributes of the particular piece of machinery.

In a further aspect, a method for interacting with machinery data using a user device and a trained machine learning model, the method comprises scanning, by a user device, a fiducial marker on a piece of machinery; retrieving, from a database, information associated with the particular piece of machinery; analyzing the retrieved information to obtain attributes associated with the particular piece of machinery; obtaining diagnostic codes or symptoms related to the piece of machinery; determining a recommendation for a diagnosis or a repair of the machinery by running a trained machine learning model on the retrieved attributes; presenting the determined recommendation on the user device, where the presentation includes step-by-step instructions for performing a repair or inspection; and updating a repair or inspection history of the piece of machinery on the repository based on a response of the user to perform or not perform the repair or inspection.

In some embodiments, the fiducial markers are scanned using a smartphone or tablet. In some embodiments, the user selects the piece of machinery from a list displayed on the user device. In some embodiments, the step-by-step instructions include visual, textual, and audio guidance. In some embodiments, the user device provides real-time guidance and/or feedback during the repair or inspection process through a user interface. In some embodiments, the user interface is an augmented reality interface. In some embodiments, the augmented reality interface provides the real-time guidance and/or feedback based on the attributes of the piece of machinery. In some embodiments, the attributes associated with the piece of machinery are one or more of hours of use, make, and model; and one or more of repair history, quantity of bushels harvested, variety of crop, and geographical region of use.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

The details of one or more embodiments of the invention are set forth in the accompanying drawings and the description below. Other features, objects, and advantages of the invention will be apparent from the description and drawings, and from the claims. The materials, methods, and examples are illustrative only and not intended to be limiting.

DETAILED DESCRIPTION

Figure 1:
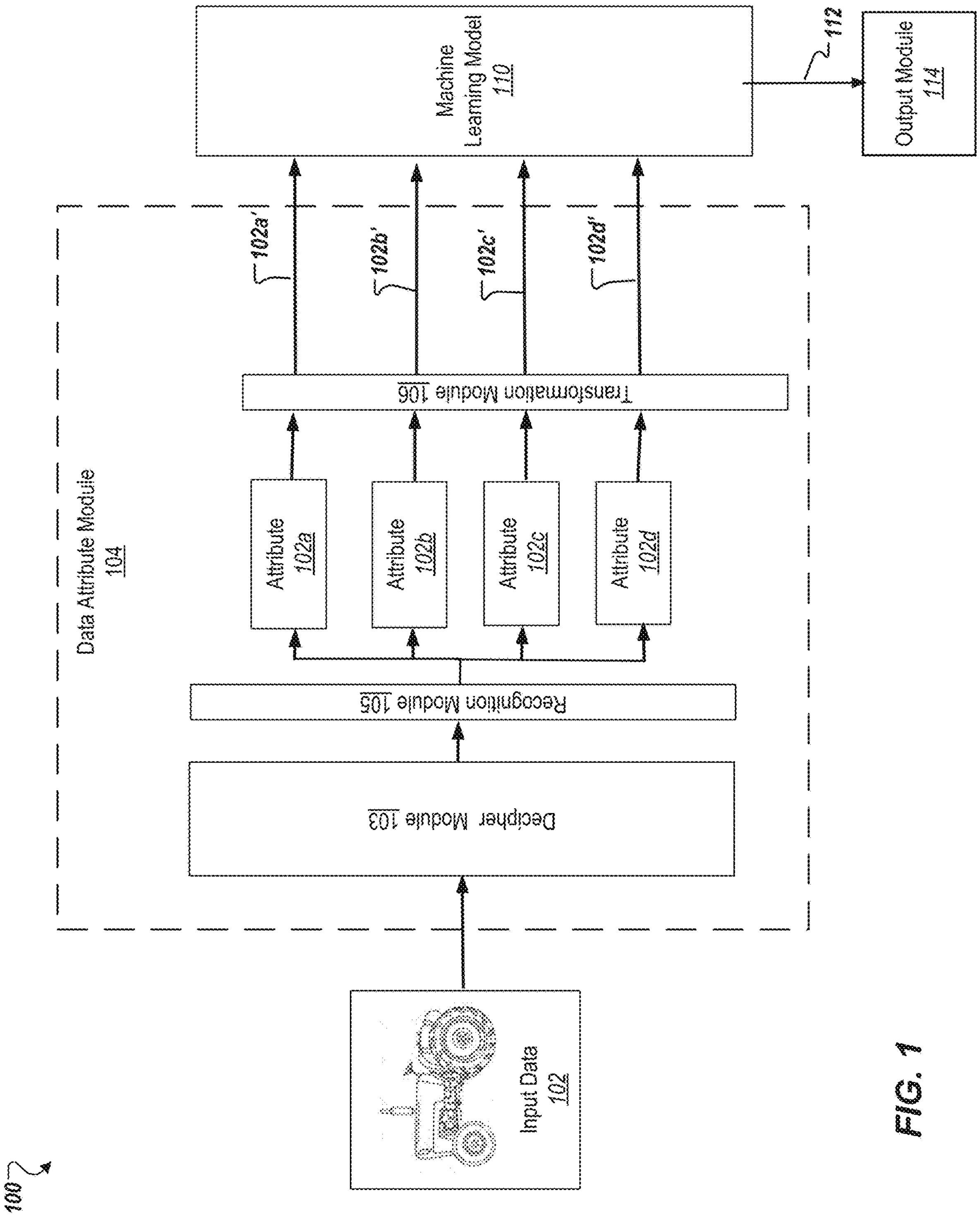
FIG. 1 depicts an example predictive agricultural machinery evaluation system according to implementations of the present disclosure.

The present disclosure provides a computer system configured to perform predictive agricultural machinery evaluations. The system runs a machine learning model that receives input data corresponding to a piece of agricultural machinery and provides an evaluations of the machinery. The evaluation can include a current status of the machinery (e.g., a diagnosis of a symptom of a fault), and/or a prediction of a repair, maintenance, or replacement of particular components of the machinery in a future, e.g., within an estimated time in the future.

The system receives input data that corresponds to a piece of agricultural machinery. The input data can include historical and identifying data about the piece of agricultural machinery such as work order data, a quantity of hours the piece of agricultural machinery has been used, make, model, repair history, a discovered symptom of a fault (e.g., a noise, a leak, a smell, or an observed operation), etc.

The system can identify one or more attributes from the input data. The system applies the machine learning model on the attributes (or on a distilled or reformatted form of the attributes) to provide an agricultural machine evaluation corresponding to the input data. Because the machine learning model considers contextual information included in the attributes and/or real work order data this results in a more effective and customized predictive agricultural machinery evaluation corresponding to the input data. Examples of an attribute can include one or more of a geographical region of use, a quantity of hours of use, a quantity of bushels harvested, a quantity of acres used, a crop type harvested, age, make, model, previous work orders, previous repairs performed, components associated with the piece of agricultural machinery, and/or a list of previous component replacement.

An attribute can be associated with a respective characteristic or component of a respective agricultural machinery. A characteristic of an agricultural machine can include features that describe the agricultural machinery. For example, a characteristic can be one or more of a geographical region of use, a quantity of hours of use, a quantity of bushels harvested, a quantity of acers used, a crop type harvested, age, make, model, previous work orders, previous repairs performed, color, agronomical data regarding the type of soil, land, crop, and weather at which the machinery has been used or is planned to be used, etc.

A component of an agricultural machine can include features that describe the parts of the agricultural machinery. For example, a component can be one or more of an engine, a fuel tank, a radiator, a battery, an alternator, a starter motor, an ignition coil, a spark plug, an air filter, a fuel filter, an oil filter, a hydraulic pump, a hydraulic cylinder, a hydraulic hose, a hydraulic valve, a transmission, a clutch, a gearbox, a drive shaft, a differential, an axle, a wheel, a tire, a brake, a steering wheel, a steering column, a steering gearbox, a suspension, a frame, a chassis, an exhaust system, a muffler, a cooling fan, a belt, a pulley, a bearing, a seal, a gear, a chain, a sprocket, a pulley belt, a pulley tensioner, a hydraulic motor, a fuel injector, a fuel pump, a water pump, an oil pump, a pressure regulator, a sensor, a solenoid, a control valve, a control lever, an operator seat, an operator control, a light, a wiring harness, a gauge, an instrument panel, a safety switch, a hitch, an implement connection point, a power take-off (PTO), an implement control, a blade, a cutting bar, an auger, a conveyor, a roller, a feeder, a mixer, a sieve, a sieving screen, a sieving plate, a roller, a coupling, a linkage, a hook, a pin, a nut, a bolt, a washer, a spring, a bushing, a bearing, a chain, a pulley, a gasket, a seal, an o-ring, a fastener, a bracket, a guard, a shield, a cover, a handle, a lever, a knob, a pedal, a switch, a connector, a hose, a tube, an electrical wire, a circuit board, a fuse, a relay, a resistor, a capacitor, a diode, a transistor, a connector, a terminal, an electric motor, a solenoid, a touch interface, a smart component, a control panel, a touchscreen, a GPS module, a sensor, an actuator, a camera, a microcontroller, a display screen, a button, a switch, a joystick, a keypad, an indicator light, an alarm, a speaker, a Bluetooth module, a Wi-Fi module, a data logger, or a software interface.

FIG. 1 depicts an example predictive agricultural machinery evaluation system 100 according to implementations of the present disclosure. System 100 can be implemented by a computer system, or by multiple computer systems that communicate with each other, for example over a network. System 100 includes data attribute module 104, machine learning model 110, and output module 114.

Data attribute module 104 receives input data 102. Input data 102 is data that corresponds to a piece of agricultural machinery. The input data 102 can be provided to the data attribute module 104 in several different ways. Input data 102 can have a particular piece of information, e.g., machinery identification number such as vehicle identification number (VIN) number or plate number or can include several pieces of information that each can be associated with a respective attribute of the machinery. Different pieces of information included in the input data 102 can have the same or different formats. For example, the input data 102 can be provided to the data attribute module 104 via import from a fiducial marker (e.g., a QR code), tabular data (e.g., Excel), audio data, image (e.g., taken by a smart device), provided by a user (e.g., manual input of data to fields), augmented reality inspection/scan, manual inspection, CAD drawings (e.g., produced by manufacturer), plate number, registration number, serial number, and/or vehicle identification number (VIN) number.

Data attribute module 104 can optionally include a decipher module 103. The decipher module 103 receives the input data 102 and decrypts the input data 102. For example, if system 100 receives the input data 102 is an encrypted form, the decipher module 103 can decrypt the input data 102.

Data attribute module 104 includes recognition module 105 that determines one or more attributes 102*a*-102*d* from input data 102 (or from decrypted input data 102). For example, input data 102 can include a plurality of attributes related to geographical location of use, a quantity of bushels harvested, a quantity of acres worked, a crop type, an age, make, model, etc. each of which can be determined as an attribute e.g., 102*a*, 102*b*, 102*c*, 102*d*. Input data 102 can include a plurality of attributes related to characteristics or components of the machinery, as discussed above. Although four attributes are depicted in FIG. 1 there could be more, or less than four attributes identified.

Recognition module 105 can determine the attributes 102*a*-102*d* by identifying and extracting the attributes included in the (decrypted) input data 102. The identification and extraction can be done based on known attributes already stored in the system 100. For example, system 100 can include a data storage (not shown) that stores multiple attributes or classes of attributes, and each of those attributes or classes can be associated with a respective keyword or key phrase. For example, attributes corresponding the acres worked can be associated with the millage the machinery has driven or gallons of gas the machinery has consumed. Accordingly, the attributes associated with the acres worked can be identified by searching for "millage" or "miles" and "gas," "litter," or "gallon of gas" or other keywords or key phrases that are stored in the data storage as being relevant to mileage or to gas use. In general, the data attribute module identifies and separates attributes related to any work history or general characteristics of the machinery, including (but not limited to) repair history, service intervals, machine usage, statistics regarding the specific make and model of the machinery, agronomical data regarding the type of soil, land, crop, and/or weather at which the machinery has been used or is planned to be used, etc.

Recognition module 105 can separate the identified attributes. For example, an attribute related to a type a crop and acres harvested can be identified by the recognition module as three different attributes: a first attribute 102*a* that includes the type of crop, a second attribute 102*b* that includes the acres of the crop that have been harvested, and a third attribute 102*c* that is identified as a quantity of bushels harvested of the type of crop in attribute 102*a* given the quantity of acres identified in attribute 102*b*.

In some implementations, the input data 102 can include a work order, and recognition module 105 can identify and/or separate one or more attributes from the work order. In some implementations, system 100 communicates with an external computing device (not shown) to retrieve the work orders associated with the input data 102, e.g., associated with a VIN number of a machinery. For example, a past or current problem with the engine of the piece of agricultural machinery corresponding to the input data 102 can be described in a work order and provided to the data attribute module 104 as part of the input data 102 or by retrieving from the external computing device.

Recognition module 105 can identify attributes associated with the work order. For example, a described engine problem could result in an attribute indicating a first component failure (e.g., a carburetor failure) and assigned attribute 102*b* and separately, a second component failure (e.g., a spark plug failure) which is assigned as attribute 102*c*. Recognition module 105 can use the work order to identify one or more keywords (e.g., an engine model, e spark plug type, etc.) that the module can use to identify one or more attributes corresponding to the keywords; the module can use the keywords to identify the attributes from the work order or from the input data 102.

Optionally, the data attribute module 104 can include a transformation module 106. The transformation module 106 can transform the attributes 102*a-d* to transformed attributes 102*a'-d'*. The transformation can include data reformatting, data cleaning, categorizing attributes, etc. Data reformatting can include reformatting attributes 102*a*-102*d* to respective formats recognizable by the machine learning model 110. Data reformatting can include processes to unitize the formats of the attributes 102*a-d* to a particular format that is compatible for input into the machine learning model 110. For example, reformatting can include converting textual or image data to respective numbers in a scale, or numbers in a scale to respective textual or image. For example, for a particular component of a machinery, converting "new" or an image of a new component to 5 in a 0 to 5 scale, "used but like new" or data associated with a date of purchase or the use of the component to 4 or 3, data associated with an image of a defect in the component such as leakage, looseness, or fractures in the component to 1 or 2 (depending on the severity of the defect), and an image of a broken component to 0.

Data cleaning can include cleaning and/or categorizing the attributes. Data cleaning can include removing attributes that are not needed for a particular piece of agricultural machinery for determining the evaluation. Data cleaning can include dividing a particular attribute into multiple transformed attributes, e.g., based on particular information included in the attribute such as date. Categorizing attributes can include putting attributes that are related to the same component, e.g., engine, in one category. The category can then be reformatted to correspond to a format associated with that component, e.g., the engine data. Accordingly, the transformation module 106 can provide a number of transformed attributes that is the same, fewer, or more than the number of attributes (e.g., 102*a*-102*d*) that the recognition module 105 had identified.

In the example system 100 depicted in FIG. 1, the transformation module 106 transforms the attributes 102*a-d* after the recognition module 105 identifies (and separates) the attributes 102*a-d* to produce transformed data attributes 102*a'-d'*. However, embodiments are not so limited and the transformation module 106 can be implemented to operate before the recognition module 105. In such implementations, the transformation module reformats and/or cleans the input data 102 (or the decrypted input data 102) before the recognition module identifies the attributes in the data.

Referring back to FIG. 1, the respective transformed data attributes 102*a'-d'* are input into the machine learning model 110 (e.g., a trained machine learning model). The parameters of the machine learning model 110 are applied to each of the respective transformed attributes 102*a'-d'* to provide a current or predictive agricultural machine evaluation (i.e., an output 112) that corresponds to the input data 102.

The evaluation (output 112) can include a recommendation for an inspection, a repair, a predicted failure, a predicted cost to operate, a predicted cost to repair, a predicted value, a predicted replacement cost, a repair component list, and/or a tutorial (e.g., inspection or repair) that is customized based on the attributes 102*a-d* (or transformed attributes 102*a'-d'*) and thus specific to the particular agricultural machinery identified by input data 102.

The output 112 from the machine learning model 110 is provided to the output module 114. The output module 114 uses the output 112 from the machine learning model 110 to facilitate providing to a user a presentation of the evaluation. For example, the output module 114 can facilitate the representation of the evaluation by displaying, playing audio or video, or presenting step by step recommendation for an inspection, a repair, a predicted specific to the particular agricultural machine.

The output 112 can include suggested inspection points on the agricultural machine. For example, the inspection points can be displayed to a user and include a component part with a probability indicating how likely the component part will fail within a certain period of time, e.g., within the next month or year. The output 112 can include a recommendation to run or repair or replace the agricultural machine that corresponds to the input data 102, predicted failure probabilities of components on the agricultural machine, generate a parts list and job/work list, application guidance via teleconference where users can access support resources for questions. Because the output 112 is based on the attributes 102*a-d* that correspond to the machine's work history (e.g., geographic, type of crops, etc. of the harvesting work that the machine has performed), a user can be alerted to checks and inspections that can otherwise not be a part of a routine inspection.

Figure 2A:
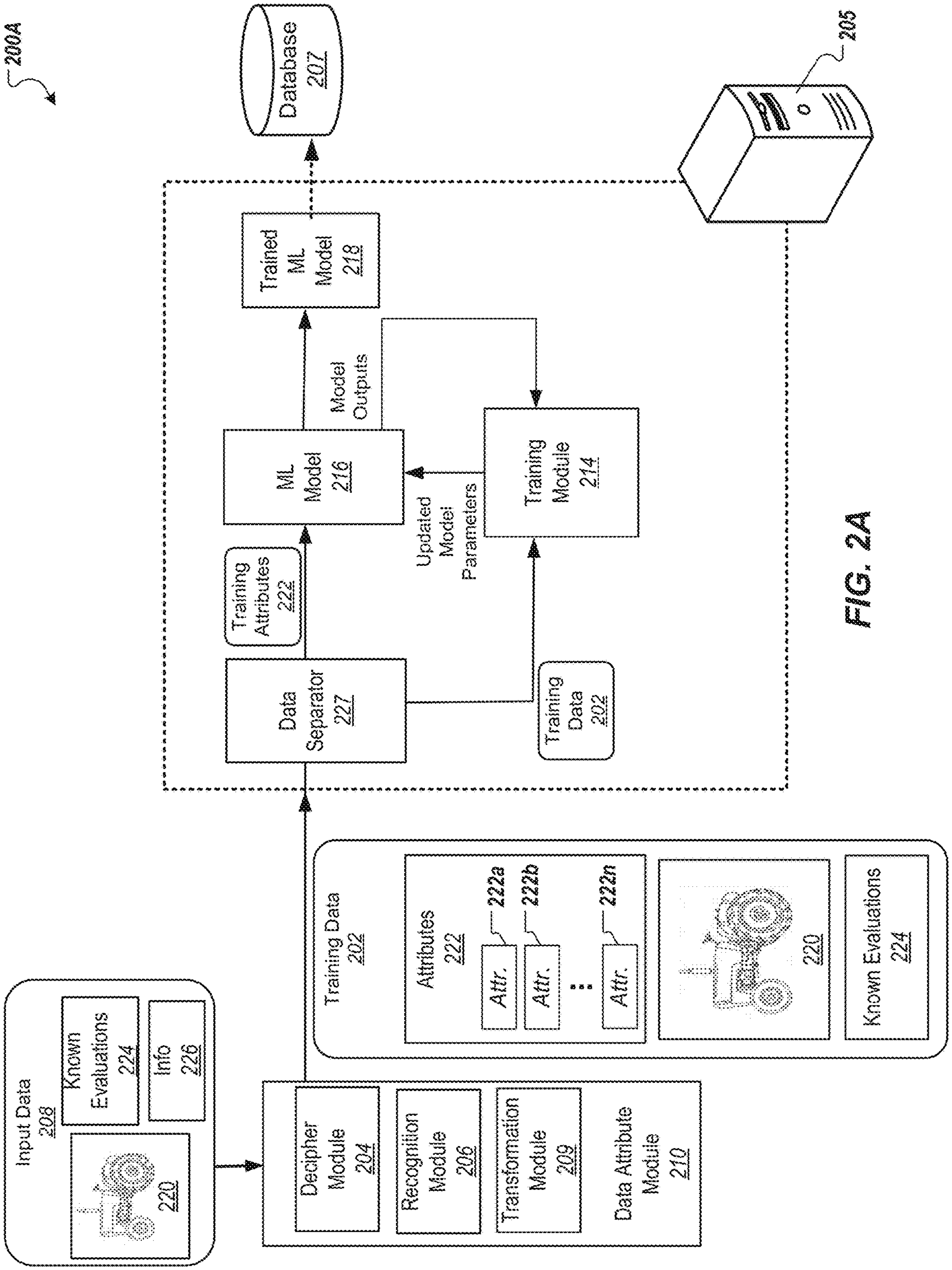
FIG. 2A depicts an example system for training a computer model for a predictive agricultural machinery evaluation according to the implementations of the present disclosure.

FIG. 2A depicts an example system 200A used for training a machine learning model 216. The trained machine learning model 218 can be used as the machine learning model 110 shown in FIG. 1.

The system 200A includes a computer system 205 that uses training data 202 to train the machine learning model 216, resulting in a trained machine learning model 218. Through training, the machine learning model 216 learns how to output an agricultural machine evaluation based on respective attributes corresponding to a piece of agricultural machinery. The trained machine learning model 218 is then stored, e.g., in a database 207 or other data storage, where it can be later be provided to other systems or used to perform inferences on input data, for example, as discussed in FIG. 1.

The machine learning model 216 can be, for example, a neural network, a support vector machine, a classifier, a regression model, a clustering model, a decision tree, a random forest model, a genetic algorithm, a Bayesian model, a Gaussian mixture model, a gradient boosting model, or a dimensionality reduction model that computer system 205 trains to obtain the trained machine learning model 218.

Like the input data 102 discussed above for FIG. 1, input data 208 includes information associated with respective agricultural machineries. For example, input data 208 can include identification information of a tractor 220 (as an example agricultural machinery), background information 226 of the tractor 220 such as its work history, one or more work orders, components, etc. of the tractor, and known evaluations 224 associated to tractor 220. Known evaluations can include what happened to particular components of or to the whole tractor 220 at future times post the dates that the background information 226 (e.g., work history or the work orders) was generated or reported.

Input data 208 can be obtained from various sources. For example, the work history or the work orders can be obtained from one or more respective sources such as a manufacturer, repair facilities, owners, distributers, historical records, etc. Each source can provide the data in a respective format, which would result in the input data 208 to have information in multiple formats. In that case, data attribute module 210 can reformat the input data before providing the data for training the machine learning model 216.

Data attribute module 210 can operate as described in connection with the data attribute module 104 (FIG. 1), to identify the training attributes 222 associated with tractor 220. As discussed with respect to FIG. 1, data reformatting is just one of the functions that a data attribute module performs on the input data to prepare the data for being inputted to a machine learning model, for either of training the model or using the model to obtain evaluation of a machinery.

Data attribute module 210 can be part of a computing system external to and in communication with computer system 205. Alternatively, data attribute module 210 can be part of the system that trains the machine learning model 216, e.g., computer system 205.

Similar to the attribute module 104 explained above, data attribute module 210 can include a decipher module 204 to decrypt an encrypted input data 208. The decipher module 204 operates as described in connection with the decipher module 103 described in connection with FIG. 1.

The data attribute module 210 can include a recognition module 206 which operates as described in connection with the recognition module 105 of FIG. 1. For example, attributes of the input data 208 can be separated and/or identified by the recognition module 206. The data attribute module 210 can further include and a transformation module 209 which operates as described in connection with the transformation module 106 of FIG. 1. For example, the attributes of the input data 208 can be determined from various data formats which can be transformed by transformation module 209 to provide (transformed) training attributes 222*a*-222*n* associated with tractor 220. In one implementation, the transformation module 209 transforms the of the input data 208 from a received format (e.g., tabular data (Excel, CSV), 3D CAD data, image data (jpeg, TFF, etc.), graph, sensor, geospatial data, video (MP4, etc.), audio (WAV, MP3, etc.), etc.) to a format compatible for training machine learning model (e.g., XML, JSON, pixel intensities, feature vectors, GML, wavefront objects, STL, etc.) to provide (transformed) training attributes 222*a*-222*n* associated with tractor 220.

The computer system 205 includes a data separator 227 that provides the training attributes 222 to the machine learning model 216 by removing other data, e.g., the known evaluations 224, from training data 202. In some implementations, the data separator 227 removes all but the training attributes 222 from the training data 202 for inputting to the machine learning model 216. In some implementations, the data separator 227 removes only the known evaluations 224 from training data 202, and keeps the rest of the data, e.g., the identification information of the tractor 220, in addition to or as part of the training attributes 222 for inputting to the machine learning model 216.

The data separator 227 provides the training module 214 with the training data 202, which includes known evaluations 224 as the target output for training attributes 222 (e.g., 222*a*-222*n*) of for tractor 220. The computing system 205 performs a training iteration that includes providing the training attributes 222 as input to the machine learning model 216, obtaining a model output, such as a neural network output vector, using the training module 214 to compare the model output with the known evaluations 224, and using backpropagation or other techniques to change (e.g., update) the values of model parameters for the machine learning model 216. This iteration can be repeated with subsequent training input data (e.g., a different tractor or other pieces of agricultural machinery with corresponding attributes) at least until the output of the machine learning model 216 reaches an accuracy higher than a specific value, e.g., more than 95%. Various training techniques and algorithms can be used. For example, when the machine learning model 216 is a neural network, training can be performed using techniques such as gradient descent (e.g., stochastic gradient descent (SGD)), conjugate gradient method, quasi-Newton's method, the Levenberg-Marquadt algorithm, etc.

Figure 2B:
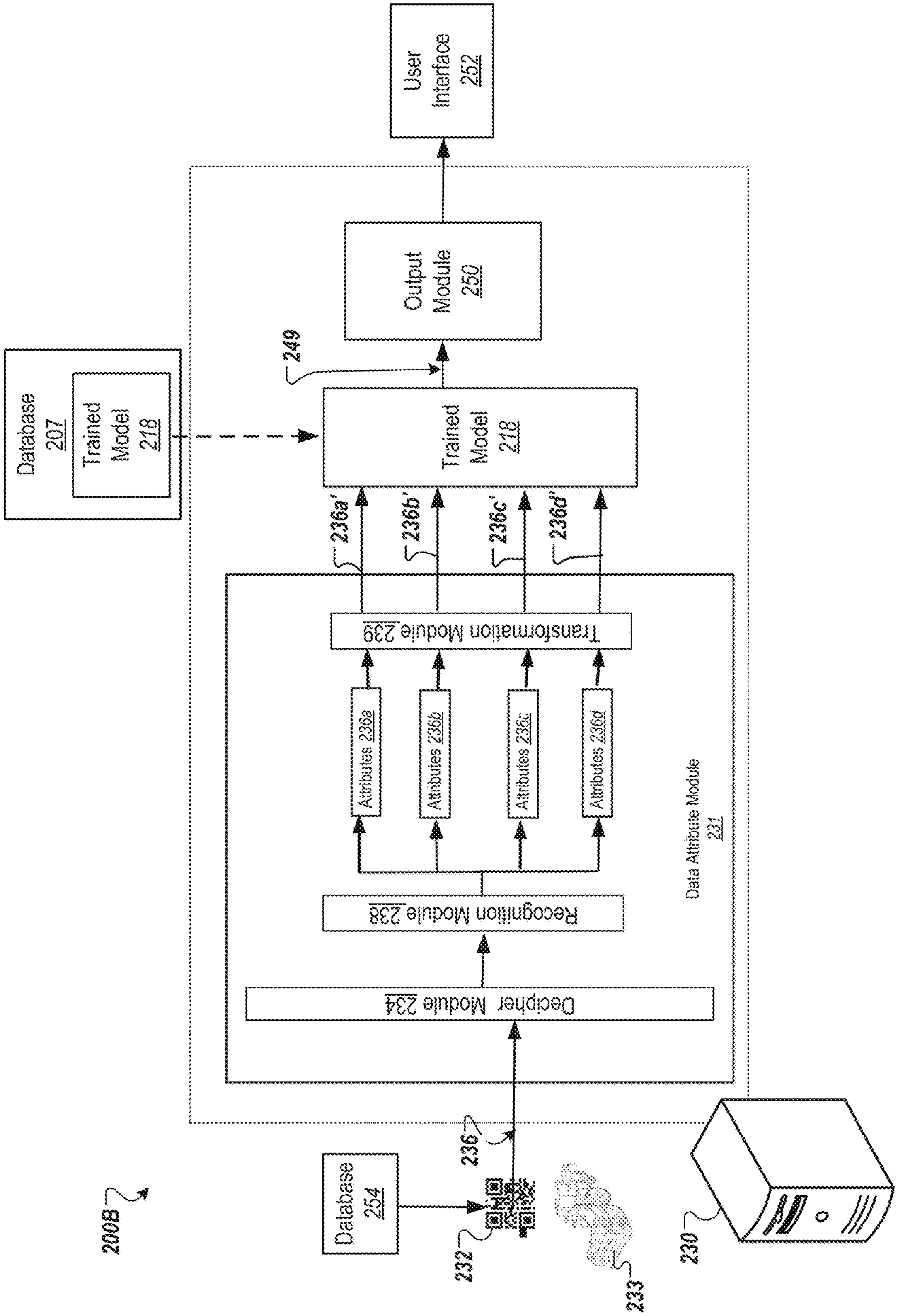
FIG. 2B depicts an example system for using the computer model trained in FIG. 2A to generate a predictive agricultural machinery evaluation based on an input data, according to the implementations of the present disclosure.

FIG. 2B depicts an example system 200B that uses the machine learning model trained in FIG. 2A (i.e., trained machine learning model 218) to generate a predictive agricultural machinery evaluation based on input data, according to the implementations of the present disclosure. System 200B is similar to system 100 shown in FIG. 1 with respect to its components and functionality. For example, system 200B includes data attribute module 231 that similar to attribute module 104 can include a decipher module 234, a recognition module 238, and/or a transformation module 239. In some embodiments, the trained machine learning model 218 is retrieved from database 207 that can be external to the computer system 230. In other embodiments, the database 207 can be a part of computer system 230.

Also similar to the input data in FIG. 1, input data 236 in FIG. 2B is associate with a piece of agricultural machinery (e.g., combine harvester 233). In some embodiments, the input data 236 is retrieved from a database 254 that can be a part of computer system 230 or external to the computer system 230. For example, a fiducial marker 232 can be scanned to retrieve the input data 236 from the database 254.

As explained above with respect to FIG. 1, the recognition module 238 identifies attributes (236*a*-236*d*) included in the input (or included in a transformed or encrypted form of the input) 236. For example, attributes 236*a-d* can include attributes related to geographical information, bushel, acre, crop type, age, make, model, etc. each of these would be determined as an attribute e.g., 236*a*.

Also as explained above with respect to FIG. 1, the attributes 236*a*-236*d* can be separated by the recognition module 238. For example, an attribute related to acres harvested and a type of crop can be identified by the recognition module 238 as attributes related to agricultural work history of the machinery, and can be separated into three different attributes: a first attribute 236*a* that includes the type of crop, a second attribute 236*b* that includes the acres of the crop that have been harvested, and a third attribute 236*c* that is identified as a geographical region of use when the type of crop in attribute 236*a* over the quantity of acres identified in attribute 236*b*.

Again, similar to FIG. 1, the attribute can be identified or separated based on one or more work orders associated with harvester 233. For example, a past or current problem with the transmission of the piece of agricultural machinery corresponding to the input data 236 (e.g., the transmission of the combine harvester 233) can be described in a work order and provided to the data attribute module 231 via the input data 236. The work order can result in one or more attributes 236*a-d* depending on what was diagnosed or fixed. For example, a described transmission problem could result in an attribute indicating a first component failure (e.g., a power failure) and assigned attribute 236*b* and separately, a second component failure (e.g., a gear shift failure) which is assigned as attribute 236*c*.

If attributes 236*a*-236*d* are in proper form or format, computer system 230 can provide them as inputs to the trained machine learning model 218. But if further data formatting or transformation is needed before the attributes become compatible for analysis by the trained machine learning model 218, transformation module 209 performs data transformation (as discussed above with respect to FIG. 1) to provide transformed attributes 236*a*'-236*d*' to the trained machine learning model 218.

The respective transformed attributes 236*a*'-*d*' are input into the trained machine learning model 218 (e.g., machine learning model 110 of FIG. 1). The parameters of the trained machine learning model 218 are applied to the respective transformed attributes 236*a*'-*d*' to provide an agricultural machine evaluation (e.g., current or predictive evaluation) as output 249.

The evaluation can include a recommendation for an inspection, a repair, a predicted failure, a predicted cost to operate, a predicted cost to repair, a predicted value, a predicted replacement cost, a repair component list, or a tutorial (e.g., inspection or repair) that is customized based on the attributes 236*a*-*d* and thus specific to the particular agricultural machine (e.g., the combine harvester 233).

The output 249 from the trained machine learning model 218 is outputted for presentation or for further processing and display. For example, the output 249 can be presented on a display of computer system 230 or can be transmitted to an external device with a corresponding user interface 252.

For example, the output 249 can be provided to output module 250 to be prepared (e.g., formatted, encrypted, etc.) for being transmitted to the external user interface 252. The external user device uses the data received from computer system 230 to provide an output representing the evaluation of the attributes 236*a*-*d* of the input data 236 (e.g., corresponding to combine harvester 233). Non-limiting examples of an external device can include extended reality devices (e.g., virtual reality or augmented reality devices), smart phones, computers, projectors, etc. The external device can be or can include extended reality glasses or goggles, an app, or a customer service type application to guide repairs through the user interface 252.

In some implementations, the user interface 252 is internal to the computing system that runs the machine learning model (e.g., computer system 230). For example, the user interface 252 can be part of an augmented reality device (e.g., a goggle) that can receive the input data 236 from database 254, and also has a processor configured to run the trained machine learning model 218.

In some implementations, the output module 250 prepares the output 249 for presentation on the user interface 252 (either on an external device or as part of system 230), by, for example, converting the data to a format displayable on the user interface 252. For example, the output module 250 can convert the recommendation portions of output 249 to indicator data for user interface indicators that can be shown on user interface 252, can add instructions, e.g., step by step guidance, on how to perform a particular recommendation, can add numbers or other priority indicators to indicate to the user the recommendations that should be prioritized, etc. In some implementations, the device that includes user interface 252 (e.g., a device external to system 230) performs all or part of the data conversions to prepare the output data for presentation to the user.

In other implementations, the input data 236 can further include current or recent data from an inspection of the agricultural machinery 233 to identify a fault. For example, the inspection can be a visual inspection, an audio inspection, or an inspection with the help of a computing device, e.g., through an extended reality device (e.g., virtual reality or augmented reality). As discussed above, the recognition module 238 identifies attributes (236*a*-236*d*) included in the input (or included in a transformed or encrypted form of the input) 236. For example, attributes 236*a*-*d* can include attributes related to symptoms of a fault identified in the inspection, geographical information, bushel, acre, crop type, age, make, model, etc. each of these would be determined as an attribute e.g., 236*a*. Symptoms can include tactile, visual, audible, or otherwise sensible effects of a fault detected during an inspection. Examples of symptoms can include a noise, a leak, a smell, or an observed operation.

As discussed above, the trained machine learning model 218 provides an output 249 that includes evaluation of the agricultural machine based on the identified (or a transformed form of the identified) attributes. The output 249 can include a predicted diagnosis of the fault and a customized recommendation associated with the fault. For example, a relevant list of repair tasks, a relevant list of parts to be involved in the repair or maintenance, a step-by-step guidance to perform the recommended maintenance or repair, a predicted cost to repair the fault and run the equipment, a predicted lifespan if the fault is repaired, a predicted replacement cost of the agricultural machine, and/or a predicted sale cost of the agricultural machine.

The output 249 from the trained machine learning model 218 is outputted for presentation or for further processing and display. For example, the output 249 can be provided to output module 250 to be prepared (e.g., formatted, encrypted, etc.) for being transmitted to the external user interface 252.

Figure 2C:
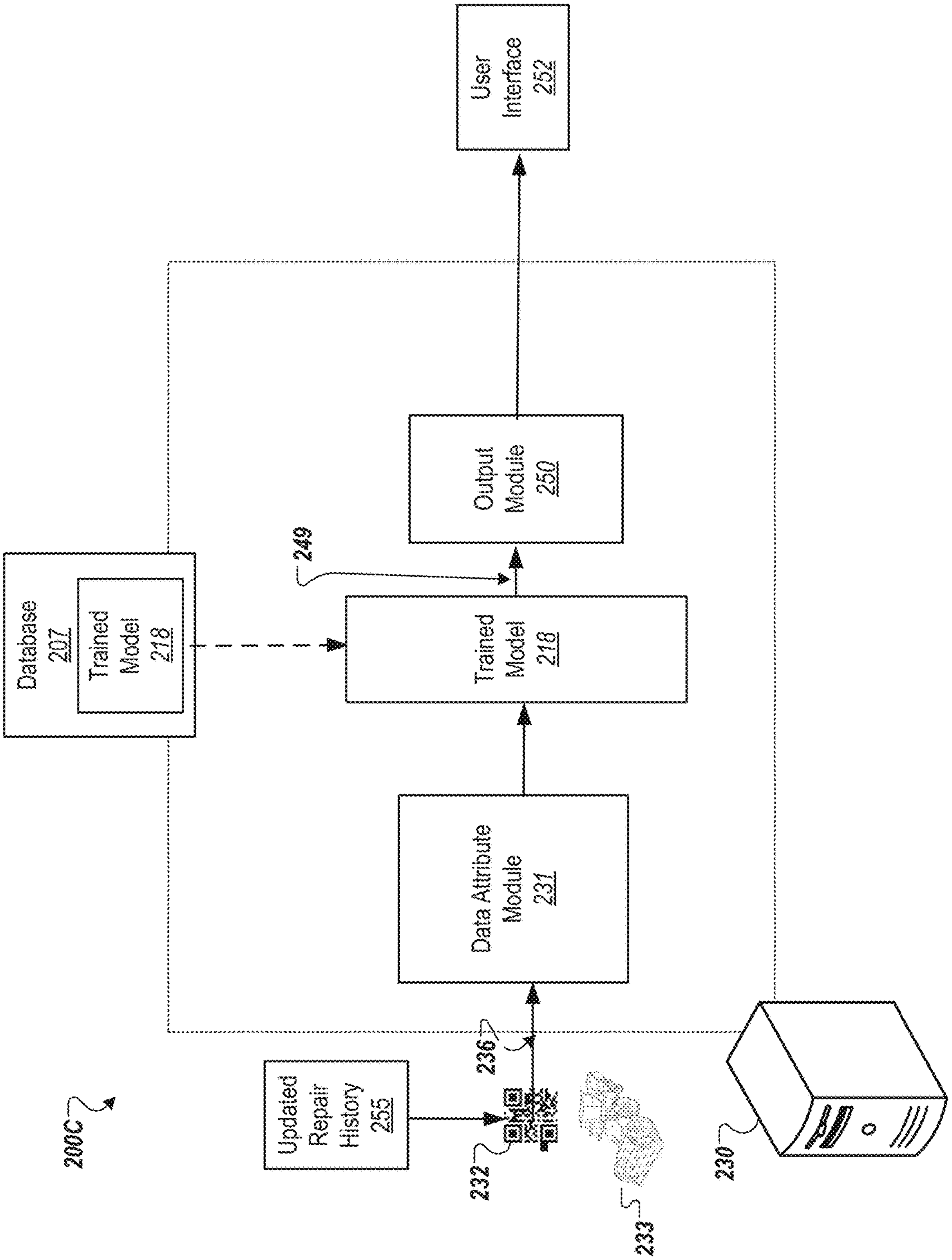
FIG. 2C depicts an example system for using the computer model trained in FIG. 2A to generate a predictive agricultural machinery evaluation based on input data that includes an updated repair history, according to the implementations of the present disclosure.

FIG. 2C depicts an example system 200C for using the computer model trained in FIG. 2A (i.e., trained machine learning model 218) to generate a predictive agricultural machinery evaluation based on input data that includes an updated repair history, according to the implementations of the present disclosure. System 200C is similar to system 200B shown in FIG. 1 with respect to its components and functionality. For example, Data attribute module 231 includes the components and functionality as described in connection with FIG. 2B.

The example depicted in FIG. 2C shows a configuration where a consecutive evaluation is generated based on an updated repair history. In such configuration, each time a repair (and/or inspection) is performed on the machinery, the system updates the repair history of the machinery and stores it in a storage module, i.e., in the updated repair history 255. In some examples, the system updates the repair history every time that the system makes a repair recommendation to the user. Such updates can include the user's response to the recommendation.

In some examples, the system can also add a priority score to the updates. A priority score can be used in the consecutive evaluation(s) of the machinery. For example, if output 249 recommends the replacement of a particular part, such recommendation or the user's response to it can be stored in the updated repair history. If the user does not follow the recommendation, e.g., if the user does not repair or replace a particular component of the machinery that the system recommended to repair or replace, the system the system can give (or increase) a priority score for the previously recommended repair/replacement, or for the evaluation of the respective component. Since passage of time would reduce the life of such component and would increase its chance of failure, the system increases the score as the time passes and the user does not take care of the recommended repair/ replacement. Once the user takes care of the recommendation, e.g., by repairing or replacing the component, the system updates its repair history (e.g., 255) to reduce or eliminate the priority score associated with that recommendation.

For instance, in this implementation, a user might provide input data about a repair made or not made based on the discovery of a fault. For example, a user may notice an unusual noise from the agricultural machinery 233 and provide information as part of input data 236 about the noise to the system 200C to produce an output 249 that includes evaluation of the agricultural machine 233 based on an such unusual. The output 249 includes an accurate diagnosis of the cause of the noise because the trained model 218 utilizes identified attributes (as described in connection with FIG. 2B). Said differently, the trained model 218 identifies the cause of the noise based on attributes that are individualized to the agricultural machine 233. Output 249 includes an individualized repair to correct the unusual noise. As is described further herein, the user interface 252 provides step-by-step guidance on how to perform the repair.

The user can then perform the repair or refrain from performing the repair. The decision to repair or not repair is provided to the system 200C as an updated repair history 255. The updated repair history 255 becomes an attribute that is associated with agricultural machine 233. As such, the decision to repair or not repair affects (a) future output 249. For example, if the user decides not to repair a broken component determined to be the cause of the noise, a future output 249 might prioritize the inspection/repair of the broken component. In contrast, if the user decides to repair a broken component determined to be the cause of the noise, a future output 249 does not include an inspection of the previously broken component because it was recently replaced.

Figure 3A:
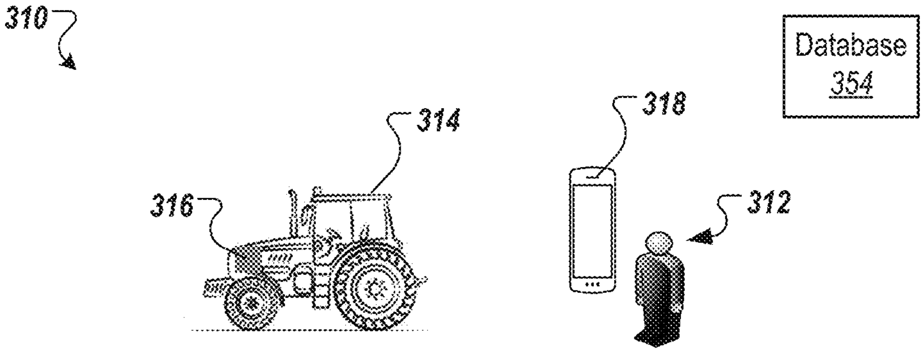
FIGS. 3A-3C depict an example process for executing the implementations of the present disclosure.
Figure 3B:
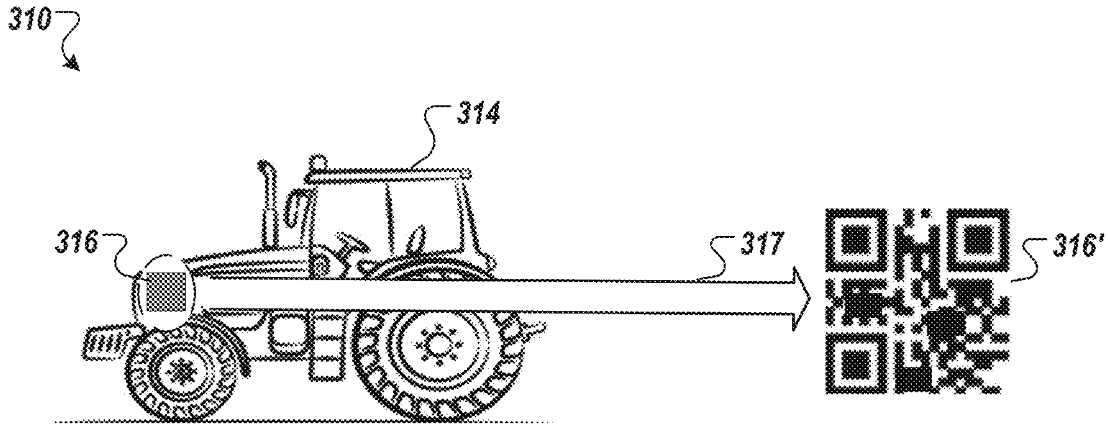
Figure 3C:
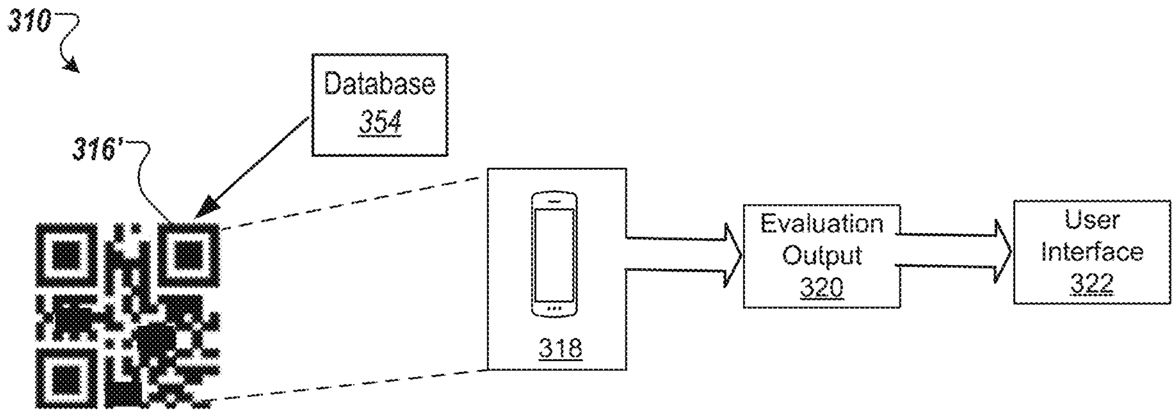

FIGS. 3A-3C depict a process 310 for executing the implementations of the present disclosure. FIG. 3A depicts an example process 310 where a piece of agricultural machinery 314 exists (e.g., in a garage, a room, outdoors). Fiducial marker 316 is associated (coupled to) the piece of agricultural machinery 314 (e.g., a tractor). Fiducial marker 316 can operate similarly to the fiducial marker 232 of FIG. 2B. The fiducial marker 316 can be scanned with a user device 318 (e.g., a smart device, headset, phone, computer, tablet, etc.). The scan causes retrieving from a database 354 data associated with machinery 314, as described in detail above. Database 354 can operate similarly to the database 254 of FIG. 2B. In some examples, a user 312 operates the user device 318 to perform the scanning.

FIG. 3B depicts a zoomed in perspective of the piece of agricultural machinery 314 (e.g., the tractor) and the example fiducial marker 316 in the process 310. As indicated by arrow 317, the fiducial marker 316' is a close-up view of the example fiducial marker 316 and in this example, is a QR code.

FIG. 3C depicts the process 310 showing what to expect after the example fiducial marker 316' is scanned by the user device 318. The user device 318 obtains input data (e.g., the input data described by FIGS. 1-2A-2C) from the database 354 and uses a trained machine learning model (e.g., the trained machine learning model 110 and 218 described with respect to FIG. 1, 2B, or 2C) to provide an output 320 to a user interface 322 (e.g., guided augmented reality, an app, or a customer service type application to guide repairs). The user interface 322 can operate the same as the user interface as described in connection with FIG. 2B.

For example, the output 320 from the machine learning model is outputted for presentation or for further processing and display. For example, the output 320 can be presented on a display, or can be transmitted to an external device with a corresponding user interface 322. Non-limiting examples of an external device can include extended reality devices (e.g., virtual reality or augmented reality devices), smart phones, computers, projectors, etc. The external device can be or can include extended reality glasses or goggles, an app, or a customer service type application to guide repairs through the user interface 322.

Figure 4A:
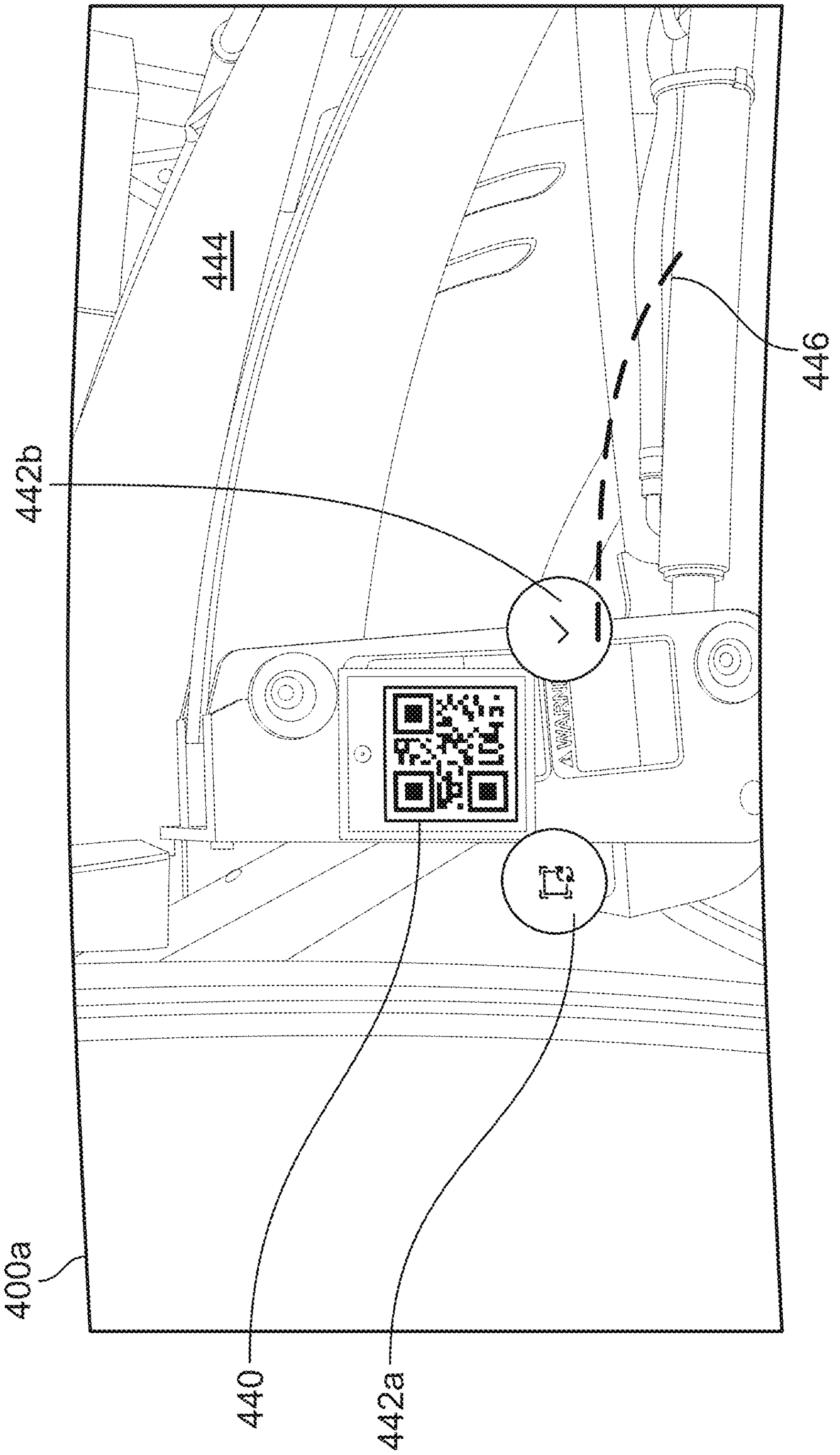
FIGS. 4A-4C are schematics of an example user interface for executing the implementations of the present disclosure.
Figure 4B:
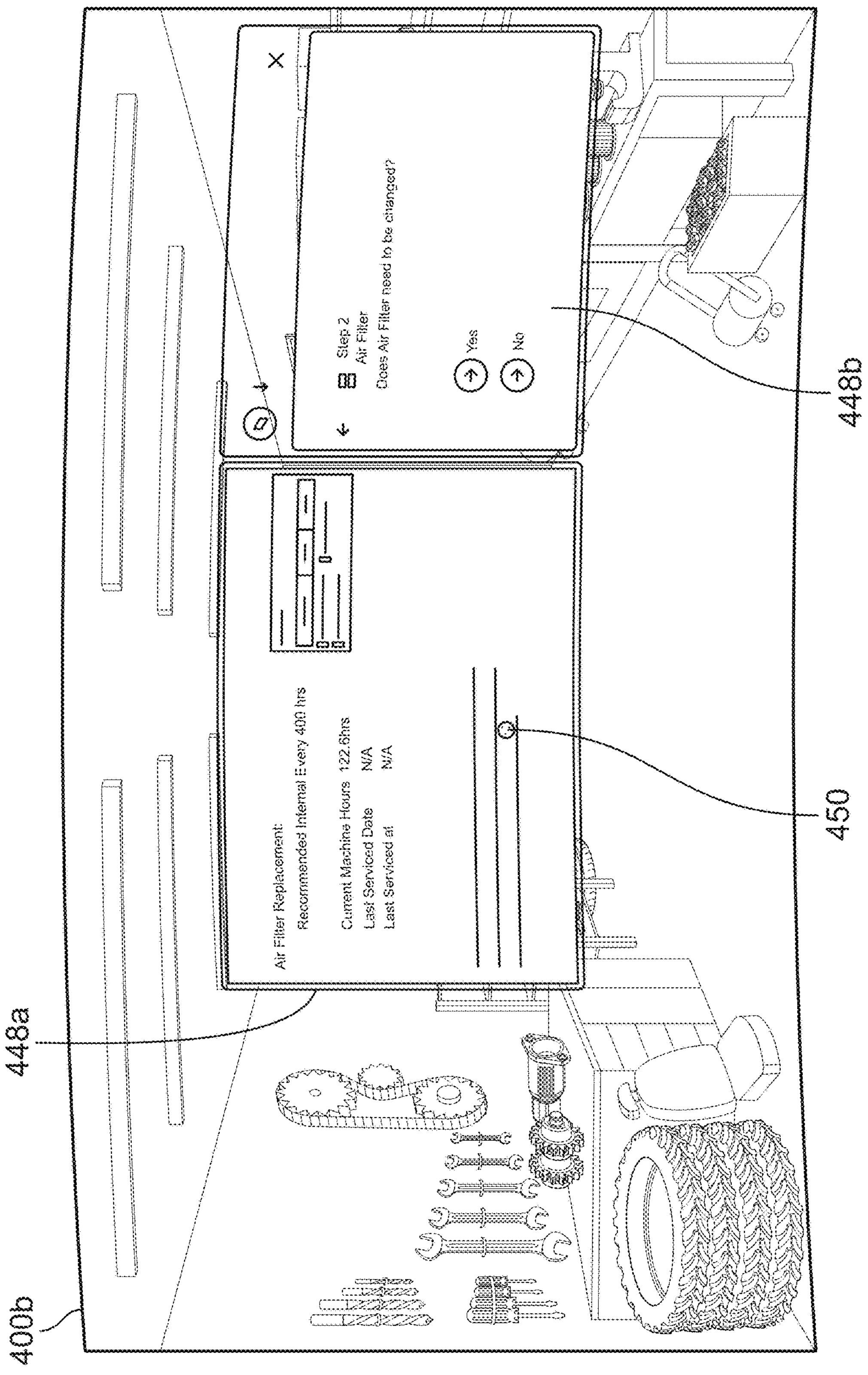
Figure 4C:
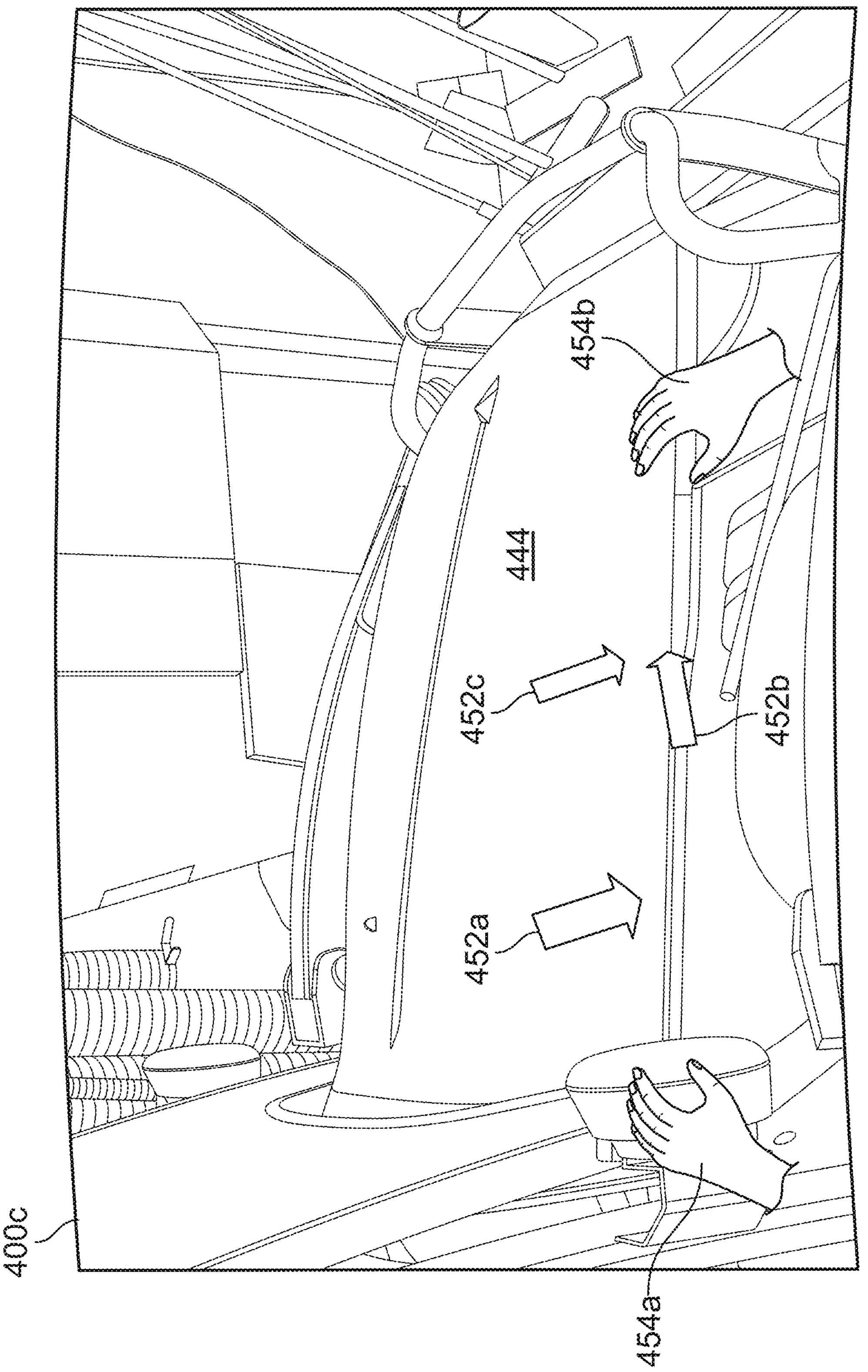

FIGS. 4A-4C depict schematics of an example user interface for executing the implementations of the present disclosure. The interfaces shown in FIGS. 4A-4C are examples of user interface 252 shown in FIG. 2B, or user interface 322 shown in FIG. 3. FIG. 4A is a schematic of a user interface for executing the implementations of the present disclosure. FIG. 4A depicts an example user perspective of an extended reality implementation of a user interface 400*a* (e.g., augmented reality of a user interface) of the present disclosure. The user interface 400*a* can be the same as described in connection with user interface 252 of FIG. 2B. A user can interact with the user device (e.g., user device 318 of FIGS. 3A-3C) to scan an example fiducial marker 440 (e.g., fiducial marker 232 of FIG. 2B, fiducial marker 316 of FIG. 3A-3B, or fiducial marker 440 of FIG. 4A) coupled to a piece of agricultural machinery 444 to obtain input data (e.g., input data 102 of FIG. 1, input data 236 of FIG. 2B). Consecutively, the user device (e.g., a device with an augmented reality interface) can present an output on the same user interface. The output can be output 112 of FIG. 1 or output 249 of FIG. 2B as prepared by the respective output module 114, 250, or output 320 shown in FIG. 3C. Alternatively, the scanning device can be separate from the device that presents an output. The user interface 400*a* can include user interface indicators as prompts or options. For example, user interface 400*a* can include prompt 442*a* and 442*b*, which indicate options that a user can select (e.g., with their hand tracking, eye tracking, or head tracking). In some examples, the user interface can also provide guide indicators that can assist with directing a user to the prompts 442*a* and 442*b*. In the example depicted by FIG. 4A, a guide indicator is visible, e.g., as a broken line 446, as an arrow (not shown), a set of sequential numbers that show the sequence of the actions to be performed, or as any other indicator that direct the user's attention to the prompts 442*a* and 442*b* such that a selection can be made. FIG. 4B is a schematic of a user interface for executing the implementations of the present disclosure. FIG. 4B depicts an example a user perspective of the extended reality implementation of a user interface 400*b* (e.g., augmented reality of a user interface) for executing the implementations of the present disclosure. FIG. 4B shows example evaluation outputs 448*a* and 448*b* (e.g., output 112 of FIG. 1, output 249 of FIG. 2B, or output 320 of FIGS. 3A-3C). For example, the fiducial marker 440 of FIG. 4A is scanned by the user device. The user device obtains input data (e.g., input data 102 of FIG. 1, input data 236 of FIG. 2B) corresponding to the piece of agricultural machinery 444 of FIG. 4A and uses a trained machine learning model (e.g., the trained machine learning model 110 of FIG. 1 and 218 of FIG. 2B) to run diagnostics on the agricultural machinery and provide an evaluation output 448*a* and 448*b* to a user interface 400*b*. The user interface 400*b* can display a predictive agricultural machinery evaluation (e.g., the output) that is based on the trained machine learning model evaluation of attributes (e.g., attributes 102*a*'-*d*' of FIG. 1 or 236*a*'-*d*' of FIG. 2B).

For example, the user interface 400*b* can display a relevant list of repair tasks and components needed to perform such repairs that are based on the context provided by the attributes evaluated by the trained machine learning model, e.g., crops, geography, past work order history, past use history, etc. In some implementations, the list includes multiple repair tasks that is recommended by the trained machine learning model. The recommended repair tasks can be prioritized by showing the user the most important task first. As explained above, an output module (e.g., 252) or a device that has the user interface (e.g., an augmented reality goggle) can perform the prioritization task. For example, the module or the device can retrieve a pre-stored list of tasks that are previously prioritized based on, e.g., a predefined rule, and compare the recommended tasks to the pre-stored list to priorities the recommended tasks accordingly. Predefined rules can include priorities defined manually by a user, priorities defined based on how likely a particular determined or predicted problem will cause the overall machinery to halt or stop working, priorities defined based on respective cost of taking care of each task, etc.

The user interface 400*b* can provide a recommended deadline for performing each of the listed tasks. Alternatively, or in addition, the user interface 400*b* can provide options for performing each of the repair tasks; each option can include a deadline and/or estimated cost associated with that option. For example, the options for repairing a broken chain can include replacing a link in the chain, repairing that particular link, or replacing the whole chain.

The user interface 400*b* can display a predicted lifespan of the agricultural machinery or components therein and/or an estimated cost to run, repair, and/or replace the machinery. In other examples, the user interface 400*b* can display cost-effective alternatives include recovering cost by selling the piece of agricultural machinery for a different use context (e.g., different geographical region or a harvesting a different crop) or extending the lifespan by repurposing the piece of agricultural machinery for a different use context (e.g., different geographical region or a different crop).

The user interface 400*b* can include evaluation output 448*a* and 448*b* which indicate options that a user can select. In the example shown by the user interface 400*b*, a cursor 450 can be utilized by the user to select available options (e.g., with their hand tracking, eye tracking, or head tracking). Based on the selection made by the user, the user interface 400*b* can display guided videos and/or provided access to virtual guided help tailored to the inspection or repair tasks. For example, the user interface 400*b* can provide curated assistance (e.g., parts/repair list, guided videos specific to the selection and machine, augmented reality overlay instructions (e.g., See, FIG. 4C).

FIG. 4C is a schematic of an example user interface for executing the implementations of the present disclosure. FIG. 4C depicts an example of a user perspective of the extended reality implementation of a user interface 400*c* (e.g., augmented reality of a user interface) for executing the implementations of the present disclosure. FIG. 4C depicts an example of a user interface 400*c* where an augmented reality user interface indicates to a user how to perform certain actions on the piece of agricultural machinery 444. Based on the output provided by the trained machine learning, a user can follow guided augmented reality steps to perform repairs, maintenance, or inspections.

The augmented reality can provide a guide for a user to locate one or more target components of the piece of agricultural machinery 444 that are obscured. For example, the augmented reality user interface 400*c* can provide arrows 452*a-c* to guide a user to move components that are obscuring a target component. In some implementations, the augmented reality user interface 400*c* can a guide with visual cues to direct the user to perform a specific movement. For example, the augmented reality user interface 400*c* can provide an augmented reality rendition of a human hand gesture 454 to perform a certain action, e.g., to open the hood. Other gestures (not shown) can also provide details for taking other actions, e.g., to close a lid, to screw/rotate a particular component, to push or pull a particular part, etc. In some implementations, the augmented reality rendition of the human hand 454*a* and/or 454*b* can indicate or present a gesture and/or movement of a user hand to show a user how to find an obscured target component. In such implementations, augmented reality human hands 454*a* and 454*b* can move simultaneously or independently.

The system presented in this document can also provide a step-by-step guide or training for a user to inspect the machinery, or to repair or maintain the machinery. For example, a user can provide input data (e.g., input data 102) to evaluate a discovered diagnostic issue. The input data can be audio data (e.g., the user speaking or using keywords to communicate the diagnostic issue), manual input of data to fields, or initiated by a guided inspection. Based on the input data, the user interface 400*c* uses a trained machine learning model (e.g., the trained machine learning model 110 of FIG. 1 and 218 of FIGS. 2B and 2C) to run diagnostics on the agricultural machinery and provide an evaluation output (e.g., 448*a* and 448*b* of FIG. 4B) to a user interface 400*c*. The user interface 400*c* can display a step-by-step guide for a user to move components and perform a repair. In some embodiments, the step-by-step guide allows users to ask questions. For example, during the step-by-step guide, the user can verbally ask questions to the user device and/or manually type questions to a user device.

For example, once an issue has been pinpointed through diagnostics or inspection, the model reviews the relevant documentation and provides the user with a comprehensive step-by-step set of instructions to perform the repair. This facilitates the user's ability to effectively address the problem with clear and detailed guidance. For instance, if the model identifies that a drive belt needs to be replaced, the user will be instructed to remove the shields, loosen the tension adjustment on the belt, remove the old belt, install the new belt, and finally tighten the tension adjustment to the specified setting. Throughout this process, users can prompt the AI for more detailed information about specific operations or specifications. For example, the user might ask (e.g., verbally, textually, or by way of a mobile device), "What torque value should I use for this bolt?" or "Which pin on this connector is the ground?" This interactive feature facilitates user access to information to complete the repair accurately and efficiently.

The step-by-step set of instructions to perform the repair can result in updates to the machine history as previously described in connection with FIG. 2C. In a first example scenario, suppose the user hears an unusual noise coming from the agricultural machinery (e.g., agricultural machinery 233 of FIG. 2C). The user inputs data about the noise into the system (e.g., system 200C of FIG. 2C), which then diagnoses the issue as a worn drive belt. Following the model's instructions provided by the user interface 400*c*, the user removes the shields, loosens the belt tension adjustment, removes the old belt, installs a new belt, and tightens the adjustment to the specified setting. The system updates the repair history (e.g., repair history 255 of FIG. 2C) to reflect this maintenance. Consequently, future outputs (e.g., outputs 249 of FIG. 2C) will not flag the drive belt for inspection, acknowledging the recent replacement. The user interface 400*c* provides detailed guidance throughout the process, ensuring that the repair is completed accurately.

In a second example scenario, the user again hears an unusual noise and inputs data into the system (e.g., system 200C of FIG. 2C), which diagnoses the same issue: a worn drive belt. However, this time the user decides not to perform the recommended repair. This decision is recorded in the system's repair history (e.g., repair history 255 of FIG. 2C). As a result, future outputs (e.g., outputs 249 of FIG. 2C) will continue to prioritize the inspection and repair of the drive belt, recognizing that the issue remains unresolved and may impact the machinery's performance. The user interface 400*c* will remind the user of the unresolved issue and may suggest addressing it to avoid potential complications.

Figure 5A:
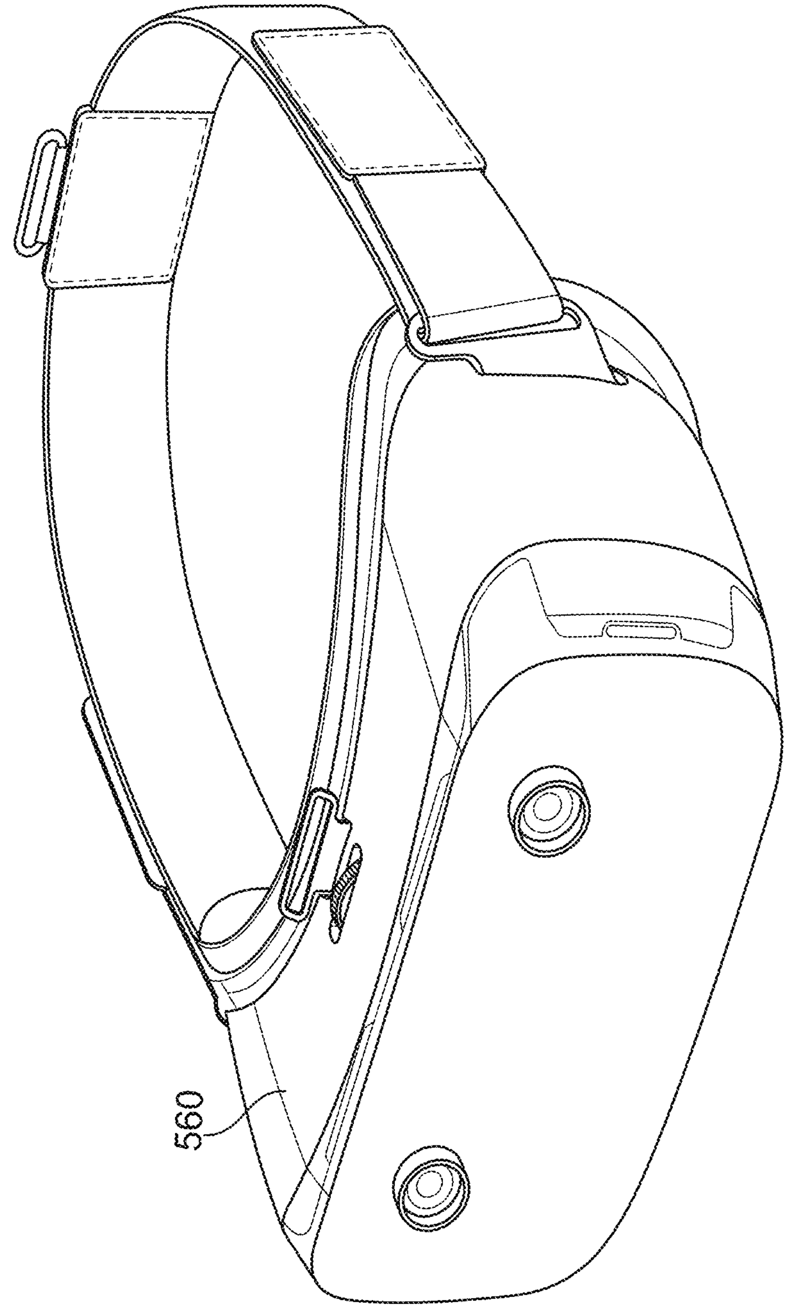
FIGS. 5A-5B are schematics of an example user device for executing the implementations of the present disclosure.
Figure 5B:
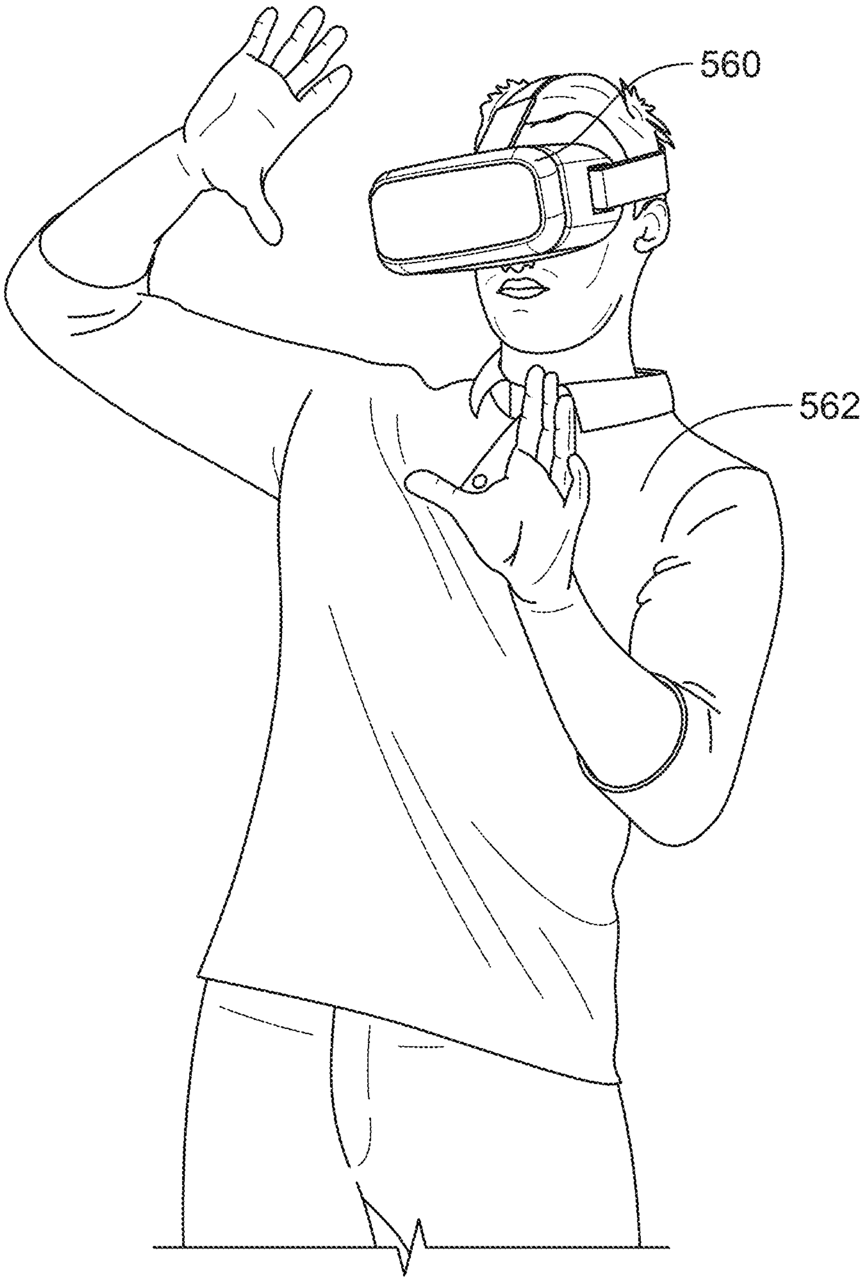

FIGS. 5A-5B depict schematics of an example user device 560 for executing the implementations of the present disclosure. FIG. 5A is a perspective view of an example external user device 560 in the form of goggles that can be used to obtain and/or manipulate an output (e.g., output 112 of FIG. 1, output 249 of FIG. 2B, or output 320 of FIGS. 3A-3C). For example, a user can operate a user device 560 (e.g., user device 318 of FIGS. 3 A-3C) to scan an example fiducial marker (e.g., fiducial marker 232 of FIG. 2B, fiducial marker 316 of FIGS. 3A-3B, or fiducial marker 440 of FIG. 4A) coupled to a piece of agricultural machinery to obtain input data (e.g., input data 102 of FIG. 1, input data 236 of FIG. 2B) and/or to present an output (e.g., output 112 of FIG. 1, output 249 of FIG. 2B, or output 320 of FIGS. 3A-3C). Examples of such manipulation are described in connection with FIGS. 4A-4C.

FIG. 5B depicts the example user device 560 as worn by a user 562 for operation. Non-limiting examples of user devices include headsets, goggles, smart devices (e.g., smart phones or tablets), smart glasses (e.g., goggles), VR controllers, tracking systems, gloves and haptic systems, motion capture systems, 3D scanners, or projection systems. FIGS. 5A-5B show example devices that include the user interface 252 in FIG. 2.

Non-limiting examples of agricultural machinery (or machine) used in this disclosure include a tractor, a combine harvester, a planter, a seeder, a sprayer, a tiller, a cultivator, a plow, a harrow, a baler, a mower, a rake, a tedder, a forage harvester, a grain cart, a grain drill, a fertilizer spreader, a manure spreader, an irrigation system, a grain dryer, a grain auger, a haybine, a disc mower, a flail mower, a rotary mower, a hay rake, a windrower, a silage chopper, a potato harvester, a sugar cane harvester, a cotton picker, a plant transplanter, a fruit picker, a grape harvester, a hop harvester, logging equipment, a skid steer loader, a front-end loader, a backhoe, a trencher, an excavator, a ditcher, a land leveler, a bulldozer, a brush cutter, a stump grinder, a wood chipper, a slurry tanker, a compost turner, poultry equipment, livestock feeding equipment, a feed mixer, a feed grinder, a milking machine, a livestock scale, a livestock trailer, livestock handling equipment, grain storage equipment, a grain conveyor, a grain elevator, a seed cleaner, a seed treater, greenhouse equipment, a mulcher, vineyard equipment, a sprout planter, a poultry litter spreader, precision farming equipment, a GPS guidance system, a drone for crop monitoring, a robotic milking system, a livestock monitoring system, a remote weather station, or a hydroponic system.

Figure 6A:
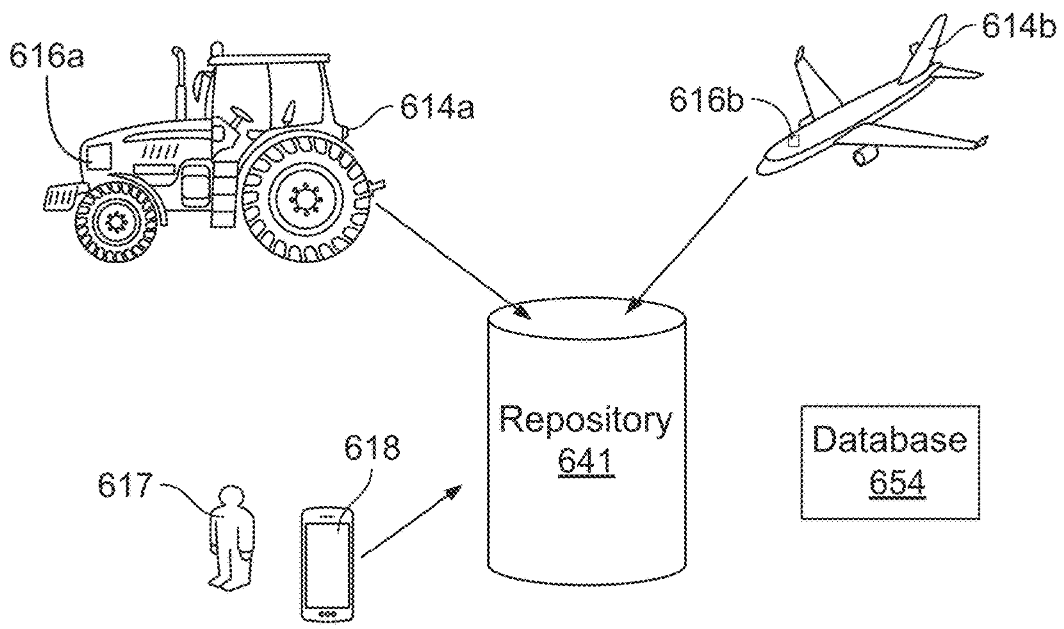
FIGS. 6A-6B depicts schematics of an example repository for executing the implementations of the present disclosure.
Figure 6B:
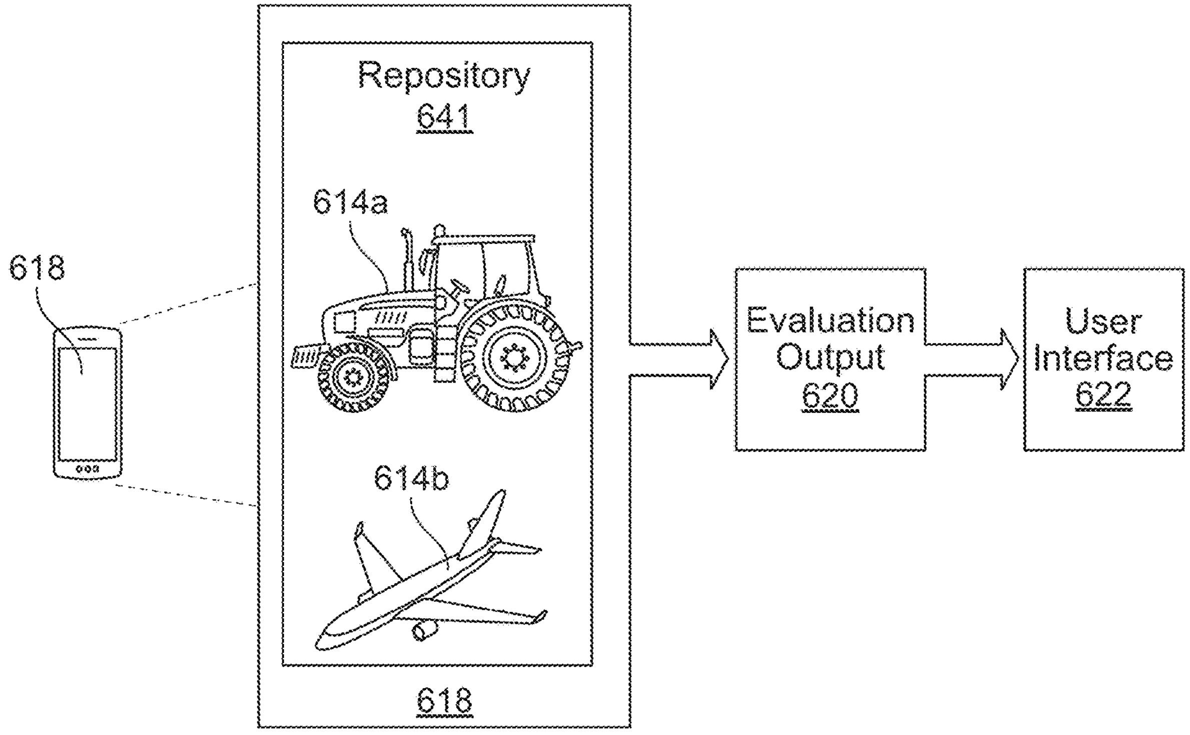

FIGS. 6A-6B depict schematics of an example repository for executing the implementations of the present disclosure. FIG. 6A shows an example repository 641 and database 654. In some embodiments, database 654 operates having one or more features similar to the database 254 of FIG. 2B. The repository 641 can be part of the overall computing system (e.g., system 230 shown in FIG. 2B) that runs a machine learning model (e.g., model 218) on input data to evaluate the machinery. In some embodiments, the repository 641 is retrieved from database 654 that can be external to the computer system. In other embodiments, the database 654 can be a part of computer system and the repository 641 can be separate from the database 654 but part of the computer system.

In some embodiments, a user 617 is associated with a repository 641. The repository 641 can include information of one or more pieces of machinery that are associated with a user 617 or environment, such as machinery owned, operated, repaired by, or otherwise cared for by the user or business. For example, a user 617 can be a technician who works on one or more pieces of machinery that are owned by different people. In this case, the technician can be associated with a repository 641 that includes information of the one or more pieces of machinery that they service. In another example, a user 617 can be an owner, manager, and/or operator of one or more pieces of machinery used in connection with a common operation (e.g., a farm, airport, business, etc.). In this case, the owner, manager, and/or operator can be associated with a repository 641 that includes the one or more pieces of machinery used in connection with a common operation.

In some embodiments, the addition of one or more pieces of machinery to the repository 641 includes inputting the attributes (e.g., attributes 236*a-d* of FIG. 2B) into the repository 641 for the respective pieces of machinery. A user 617 can be associated with a tractor 614*a* and an airplane 614*b*, each having respective fiducial markers 616*a* and 616*b*. These fiducial markers can be scanned with a user device 618, which could be a smart device, headset, phone, computer, tablet, etc. For example, a fiducial marker can be scanned to retrieve the input data (e.g., input data 236) from the database 654 as described in connection with FIG. 2B. The user 617 can then add the one or more pieces of machinery to the repository 641 which can be selectively visible to the user 617 from the user device 618.

After information of one or more pieces of machinery are added to the repository 641, the repository 641 includes information of the machinery 614*a* and/or 614*b*, including their corresponding attributes specific to each machine. Users can remove, add, and/or update the machinery information within the repository 641. For example, a user 617 may have several pieces of machinery, each recorded in the repository 641 with their associated attributes. This allows the user to input diagnostic codes (e.g., a reference code corresponding to a part or fault of the machine) or symptoms (e.g., a noise, leak, smell, or observed operation) and the system (e.g., system 200B) provides diagnostic feedback and/or inspection information based on the attributes of the respective machinery. By building a repository 641, a user 617 can select a particular machine using the user device 618 and proceed to input diagnostic codes or symptoms or initiate an inspection without having to scan the selected machine. In other words, instead of scanning the fiducial markers 616*a* and/or 616*b*, the user can select the machines directly from the user device 618, which causes data retrieval from the database 654. The user can choose to follow step-by-step instructions to perform a repair or inspection and update the selected machinery according to the decision to repair or not repair, as described in connection with FIG. 2C.

FIG. 6B provides a close-up view of the user device 618 displaying information included in the repository 641, e.g., one or more machines 614*a* and 614*b*. As described above, data is retrieved from the database 654 and the user device 618 uses a trained machine learning model (e.g., the trained machine learning models 110 and 218 described with respect to FIGS. 1, 2B, and 2C) to provide an output evaluation 620 to a user interface 622. The user interface can be through guided augmented reality app or a customer service type application to guide repairs. The output 620 from the machine learning model is presented for further processing and display. For example, the output can be shown on a display or transmitted to an external device with a corresponding user interface 622.

Figure 7:
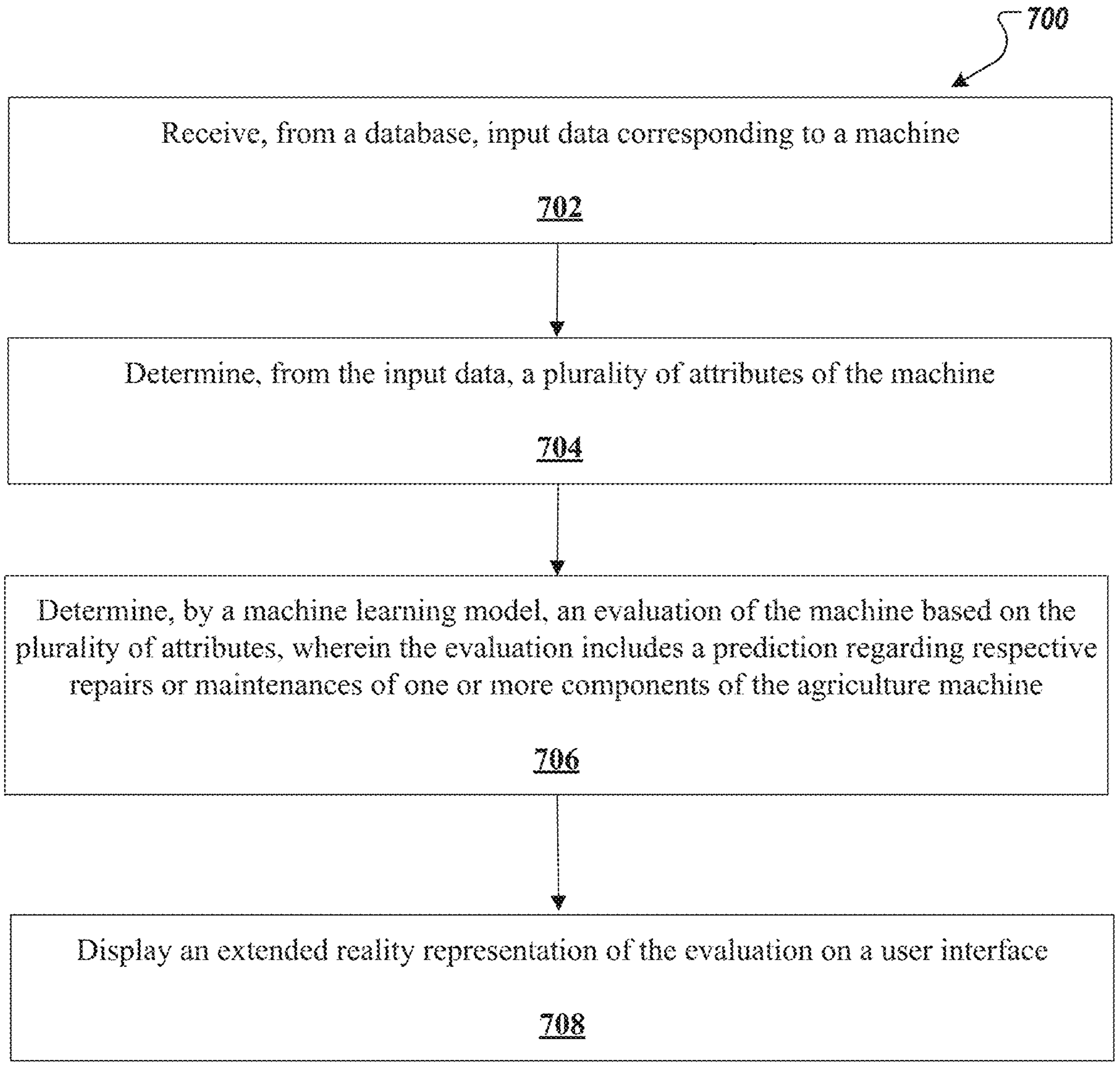
FIG. 7 depicts an example process that can be executed in accordance with implementations of the present disclosure.

Non-limiting examples of external devices include extended reality devices (e.g., virtual reality or augmented reality devices), smartphones, computers, projectors, etc. The external device can include extended reality glasses or goggles, an app, or a customer service type application to guide repairs through the user interface 622. FIG. 7 depicts an example process 700 that can be executed in accordance with implementations of the present disclosure. Process 700 can be performed by one or more computers, for example, computer system 100 of FIG. 1 or 230 of FIG. 2B.

Process 700 includes receiving (702), from a database (e.g., database 254 of FIG. 2B), input data (e.g., database 254 of FIG. 2B) corresponding to a machine, e.g., an agricultural machine.

Process 700 continues by determining (704), from the input data, a plurality of attributes (e.g., attributes 236*a-d* of FIG. 2B) for the machine. Each attribute can be associated with a respective characteristic or component of the machine.

Process 700 continues by determining (706), by a machine learning model (e.g., machine learning model 218 of FIG. 2B), an evaluation (e.g., output 249 of FIG. 2B) of the machine based on the plurality of attributes. For example, the process can include applying a set of parameters (e.g., as described in FIG. 2A) of the machine learning model on the plurality of attributes (706). The evaluation includes a prediction regarding respective repairs or maintenances of one or more components of the agricultural machine.

Process 700 continues with displaying (708) an extended reality representation of the evaluation on a user interface (e.g., user interface 252 of FIG. 2B). The extended reality representation can include one or more user interface indicators (e.g., as described in connection with FIGS. 4A-4C) that each represents performing a respective predicted repair or maintenance of the one or more components of the agricultural machine (708).

Figure 8:
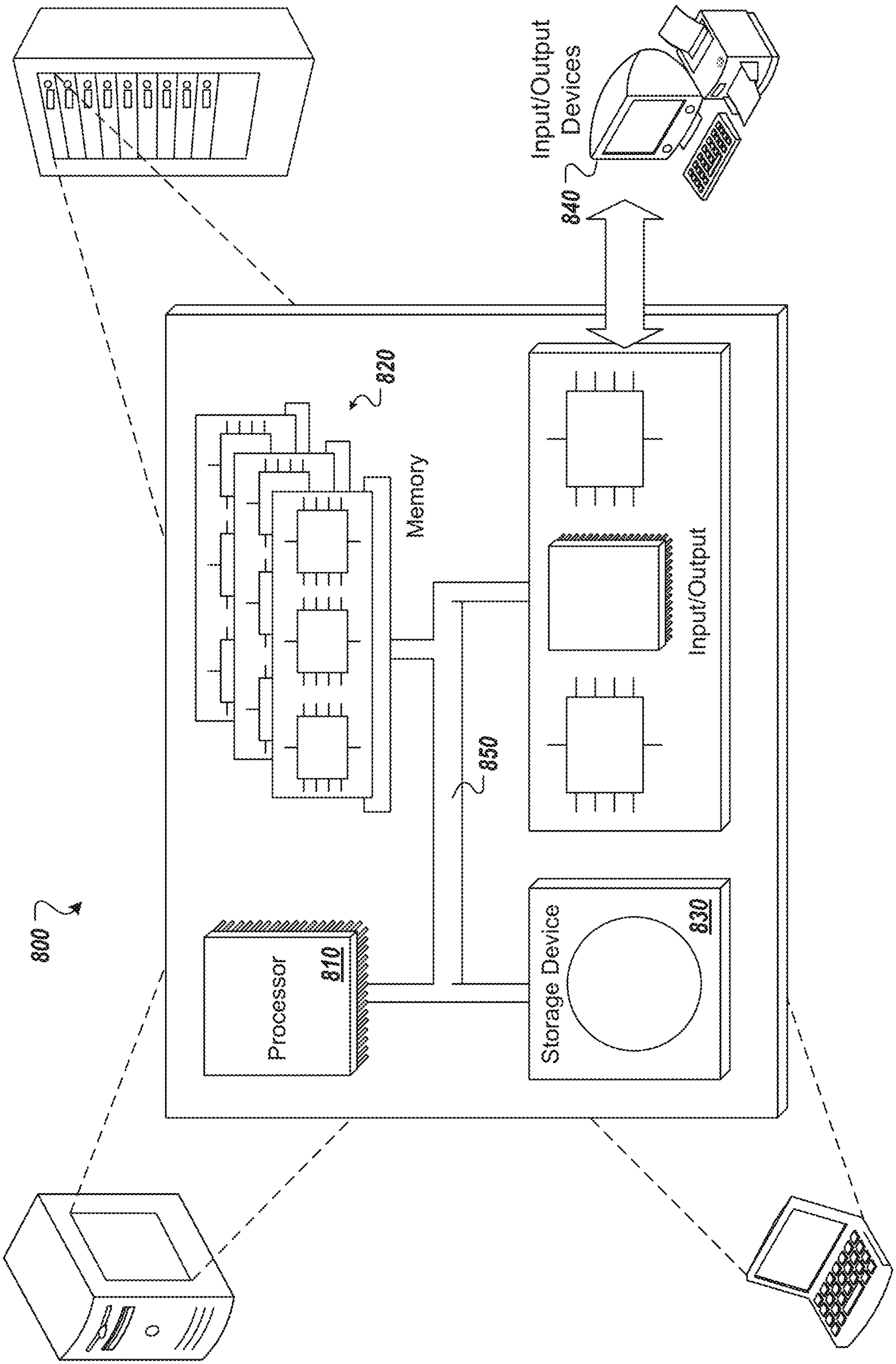
FIG. 8 depicts a schematic diagram of an example computing system for performing the operations according to the implementations of the present disclosure.

FIG. 8 depicts a schematic diagram of an example computing system 800 to execute the implementations of the present disclosure. For example, the system 800 is an example computing system that can execute systems, methods, and processes for predictive agricultural machinery evaluation as described in connection with FIGS. 1-7. As such, the system 800 can be used to perform the operations described with regard to one or more implementations of the present disclosure. For example, the system 800 can be included in any or all of the computer system(s), or other computing device(s), discussed herein. For example, system 800 can represent any of systems 100, 205, 230 shown in FIGS. 1, 2A, and 2B.

The system 800 can include one or more processors 810, one or more memories 820, one or more storage devices 830, and one or more input/output (I/O) devices 840. The components 810, 820, 830, 840 can be interconnected using a system bus 850.

The processor 810 can be configured to execute instructions within the system 800. The processor 810 can include a single-threaded processor or a multi-threaded processor. The processor 810 can be configured to execute or otherwise process instructions stored in one or both of the memory 820 or the storage device 830. Execution of the instruction(s) can cause graphical information to be displayed or otherwise presented via a user interface on the I/O device 840.

The memory 820 can store information within the system 800. In some implementations, the memory 820 is a computer-readable medium. In some implementations, the memory 820 can include one or more volatile memory units. In some implementations, the memory 820 can include one or more non-volatile memory units.

The storage device 830 can be configured to provide mass storage for the system 800. In some implementations, the storage device 830 is a computer-readable medium. The storage device 830 can include a floppy disk device, a hard disk device, an optical disk device, a tape device, or other type of storage device. The I/O device 840 can provide I/O operations for the system 800. In some implementations, the I/O device 840 can include a keyboard, a pointing device, or other devices for data input. In some implementations, the I/O device 840 can include output devices such as a display unit for displaying graphical user interfaces or other types of user interfaces.

As discussed above, the computer system (e.g., computer system 230 of FIG. 2) can identify an agricultural machinery inputting a distinguishing feature or identifier of the machine, such as a fiducial marker (e.g., 232) or a vehicle identification number (VIN) specific to the machinery. Alternatively, or in addition, the system can include or communicate with a scanning device that is capable of scanning the whole or a distinguishing component of the agricultural machinery. The system 230 can receive images of the machinery captured by the scanning device, run an image processing software on the image, and identify an identity (e.g., make and model) of the machinery. Examples of the scanning device include but are not limited to, a tablet, a smartphone, a digital camera, an extended reality device such as extended reality goggles, or any other device that includes one or more cameras capable of capturing pictures.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, application-specific integrated circuits (ASICs).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a local area network (LAN), a wide area network (WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

Figure 9A:
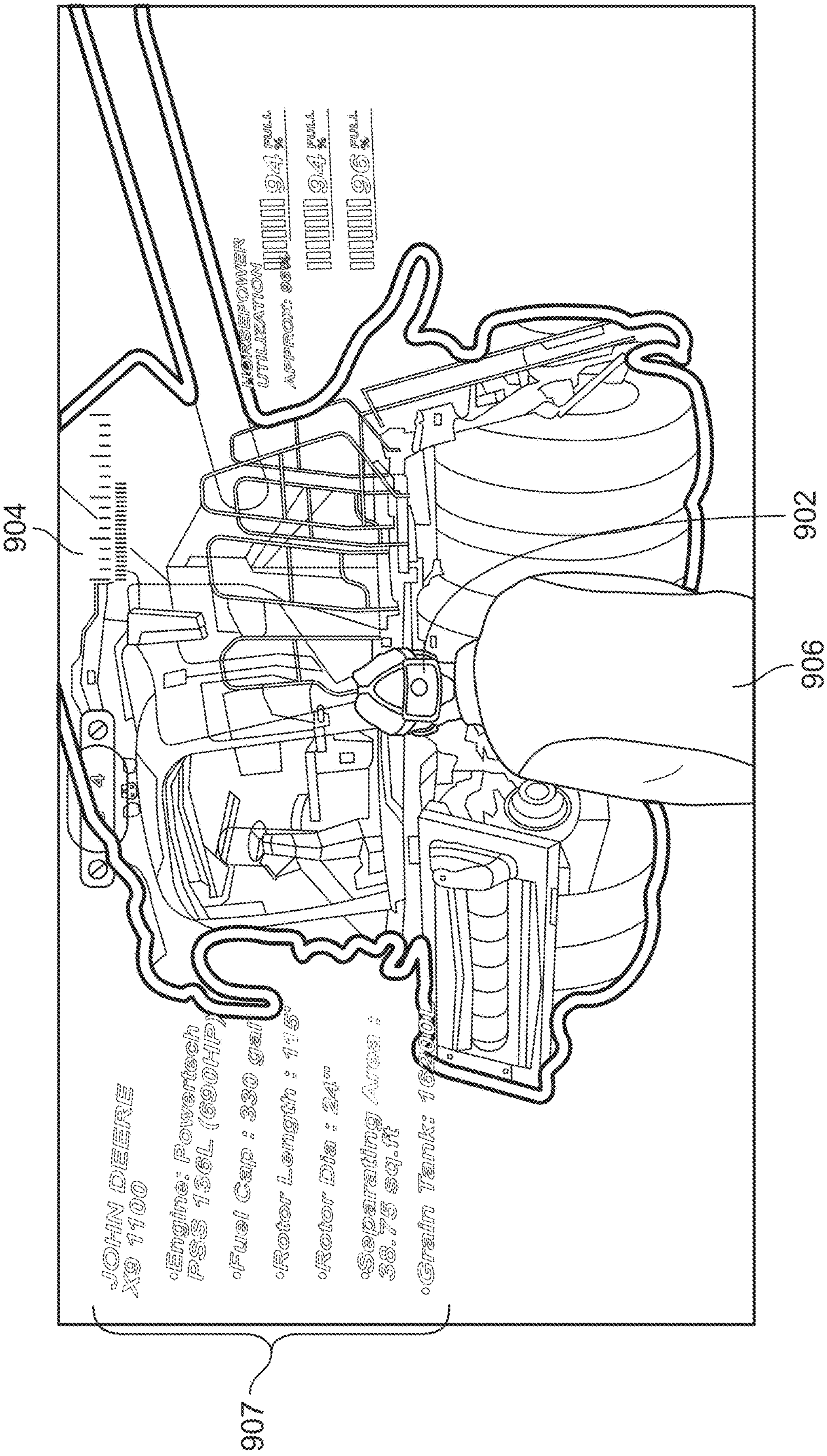
FIG. 9A depicts an example scanning device used for depicting images of respective machineries.
Figure 9B:
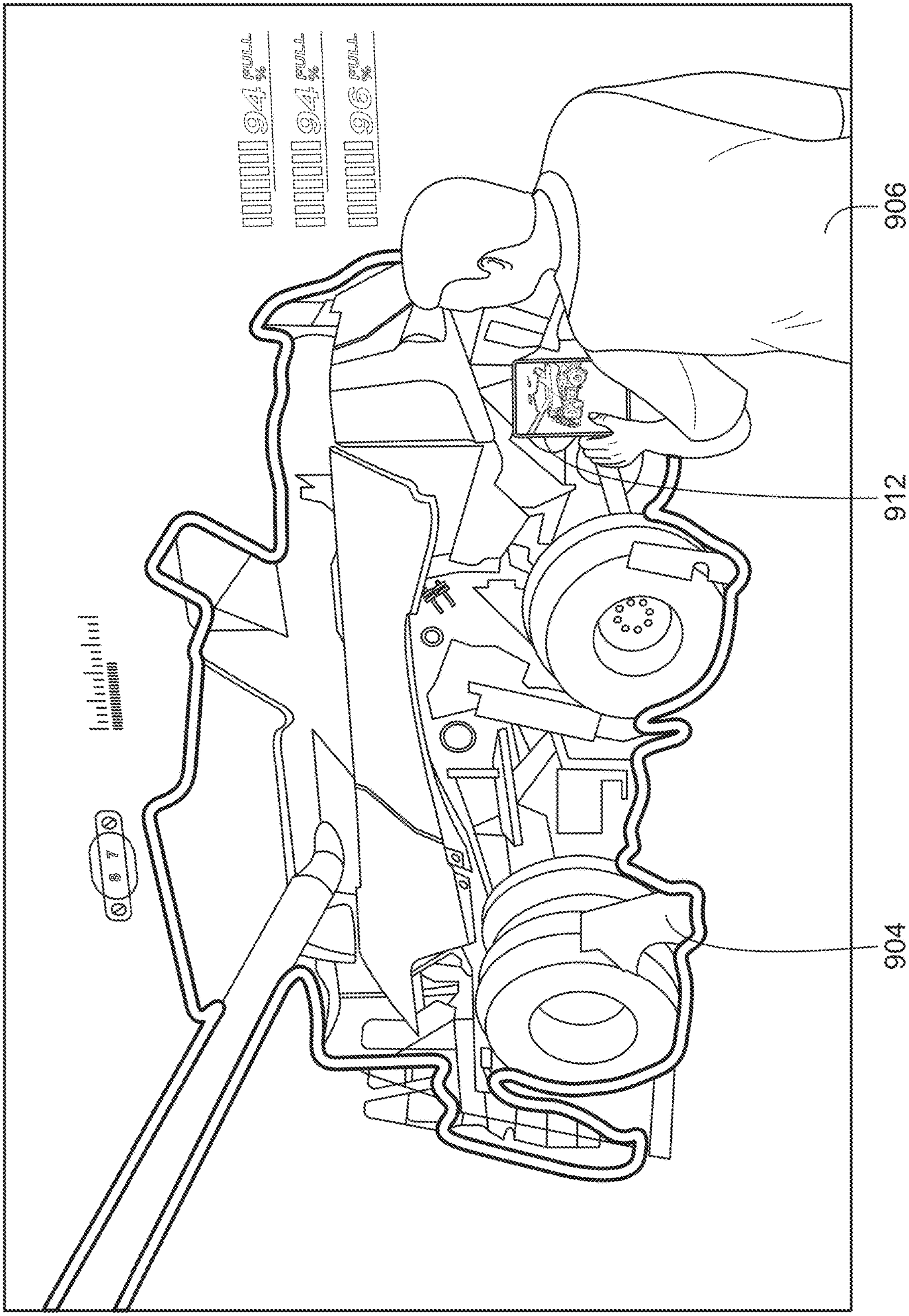
FIG. 9B depicts another example scanning devices used for depicting images of respective machineries.

FIGS. 9A and 9B show example scanning devices 902, 912 used for depicting images of respective agricultural machineries 904, 914. In FIG. 9A, user 906 is wearing extended reality goggles as scanning device 902 to take images of agricultural machinery 904 with cameras implemented on the goggles. In FIG. 9B, user 906 is holding a tablet as scanning device 912 to take images of agricultural machinery 904 with a camera of the tablet.

The scanner device can be capable of running an image processing software to identify the machinery. In FIG. 9A, for example, the scanner device identified the identity of agricultural machinery 904 through running such software, and presented to the user such identity through a list of characteristics 907. Unless the user determines that the identified characteristics are wrong, the system uses such characteristics as input data (e.g., 236 in FIG. 2B).

Figure 10A:
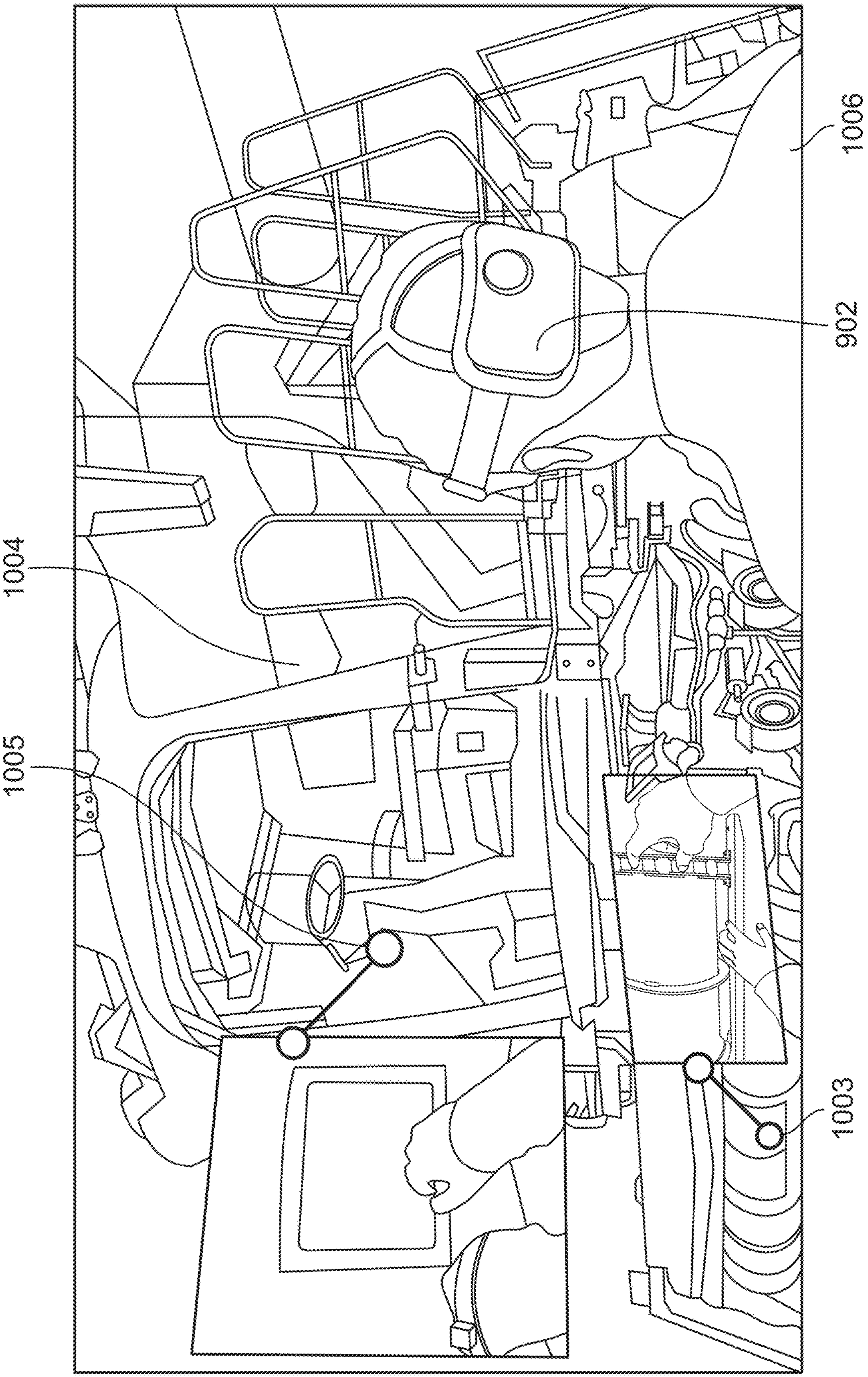
FIG. 10A depicts a scanning device for performing diagnostics of agricultural machinery.

The scanning device can be part of the overall computing system (e.g., system 230 shown in FIG. 2) that runs a machine learning model (e.g., model 218) on the input data to evaluate the machinery. Such evaluations can include providing recommendations for repair and/or inspections. In FIG. 10A, for example, scanning device 902 of FIG. 9A performs diagnostics of agricultural machinery 1004 and recommends inspection of particular parts 1003, 1005 of the machinery 1004 based on images of those parts. User 1006 can decide which component to inspect, maintain, or repair.

Figure 10B:
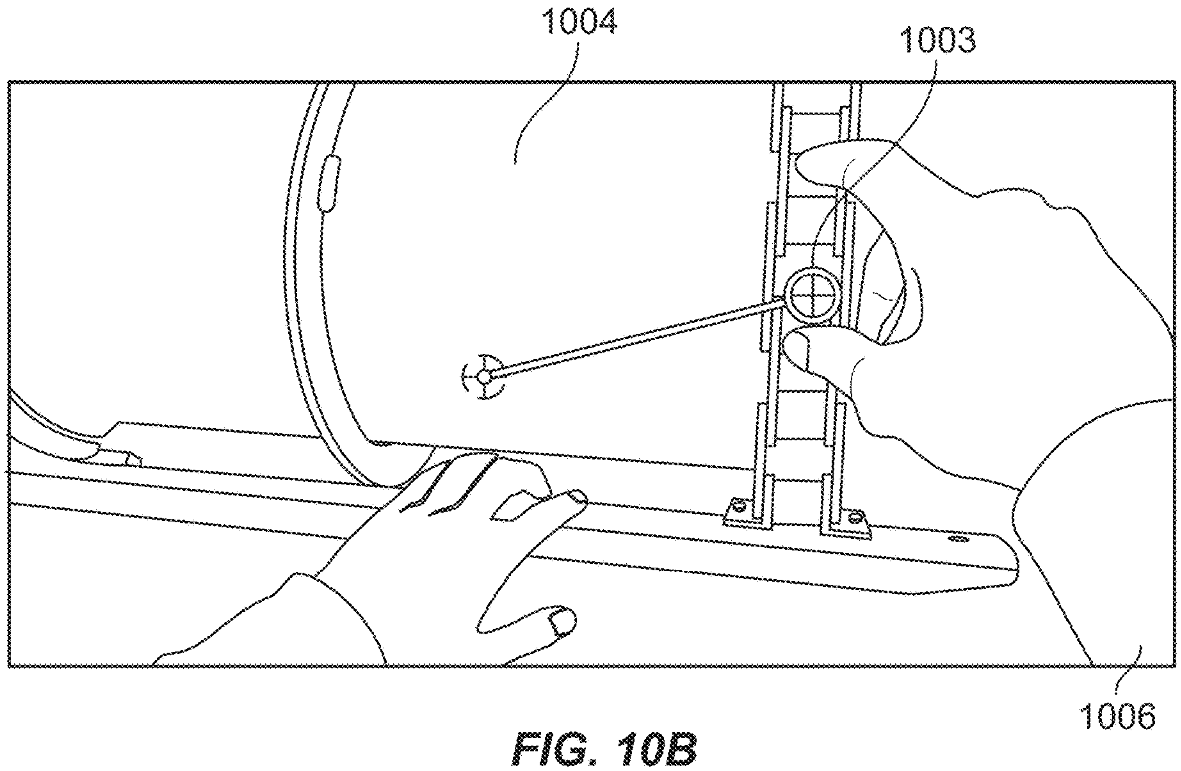
FIG. 10B is a schematic of an example user interface for inspecting a part of agricultural machinery.
Figure 10C:
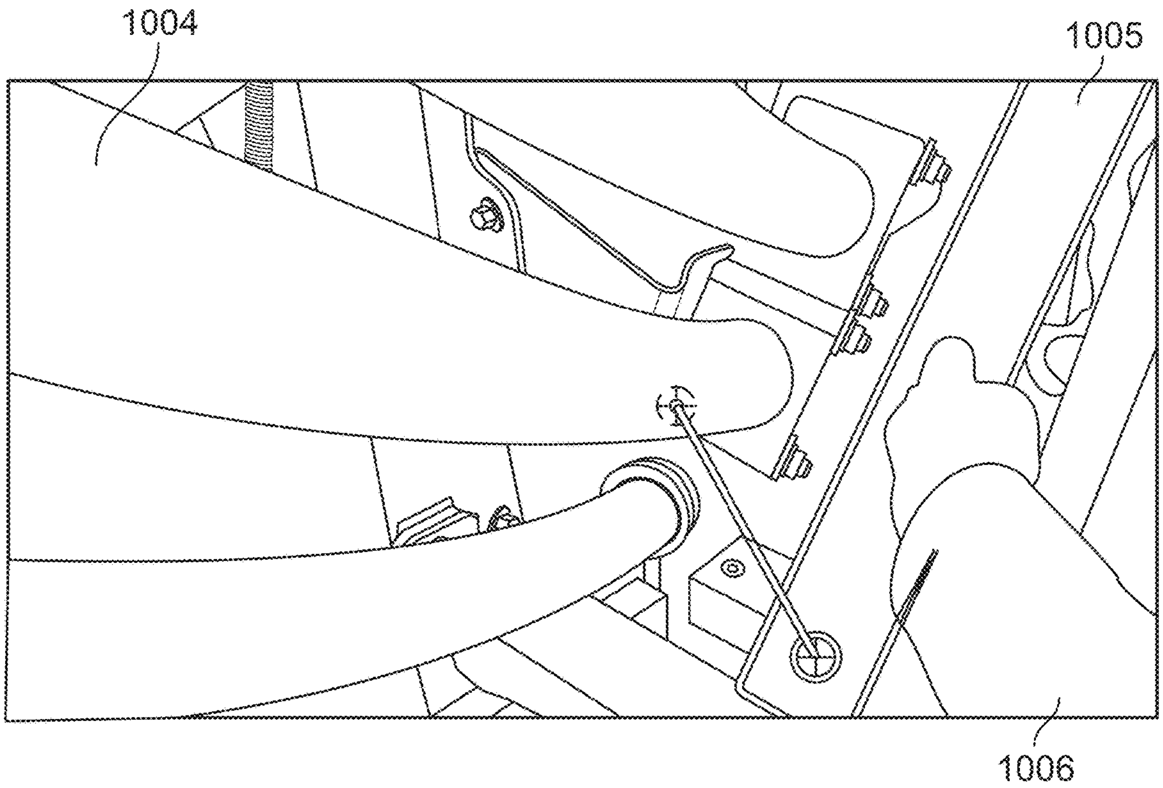
FIG. 10C is a schematic of an example user interface for inspecting a part of agricultural machinery.

FIGS. 10B and 10C are schematics of an example user interface for inspecting part 1003 of agricultural machinery 1004 that the system identified in the example system of FIG. 9A. In FIG. 10B, the user follows the instructions of the system to inspect chain links. While the user is performing the inspection, the system can update its instructions based on its real-time evaluation of the chain. The real-time evaluation of the chain can include receiving feedback from the user 1006. The system identifies potential issues on any of the links. Based on an identification of any issues with each link, e.g., corrosions, stiffness, looseness, fractures, etc., the system can recommend a different course of action to the user. For example, if there is a fracture in a link, the system can suggest replacing the link or the chain; if there is corrosion but the link is working fine, the system can suggest cleaning the chain; if there is stiffness in the link, the system can suggest oiling the link.

FIG. 10C is another example showing the user interface for inspecting another part, i.e., a belt 1005, of agricultural machinery 1004. Similar to the example discussed for FIG. 10B, the system provides step-by-step instructions to the user to inspect the belt 1005 so that the system can identify or predict potential issues with the belt 1005. The system updates its instructions in real-time based on an evaluation of the belt in each step. For example, the system can instruct the user 1006 to hold the belt in their hand, detect the user's hand's position with respect to the belt, instruct the user to pull the belt, detect the movement of the belt as a result of the user's power enforcement, detect tears and wears or potential weaknesses of the belt as it moves, and provide a recommendation on how to fix those issues, e.g., through another step-by-step set of instructions to replace the belt.

The system can perform each of the detection steps (noted above) through running image processing and machine learning algorithms so that the system can input the data, and analyze it to provide an evaluation of the part that is being inspected. Accordingly, the system can include or be in communication with a database (e.g., the database 254) that stores images of different components of the machinery from different angles of view. The database can also store images of a variety of models of the part, and a variety of defects that can happen on each model. The more images stored in the database the more likely the system can identify a variety of defects on different models of the part. Further, the system can update based on the outcome of the inspection as described in connection with FIG. 2C.

Figure 11A:
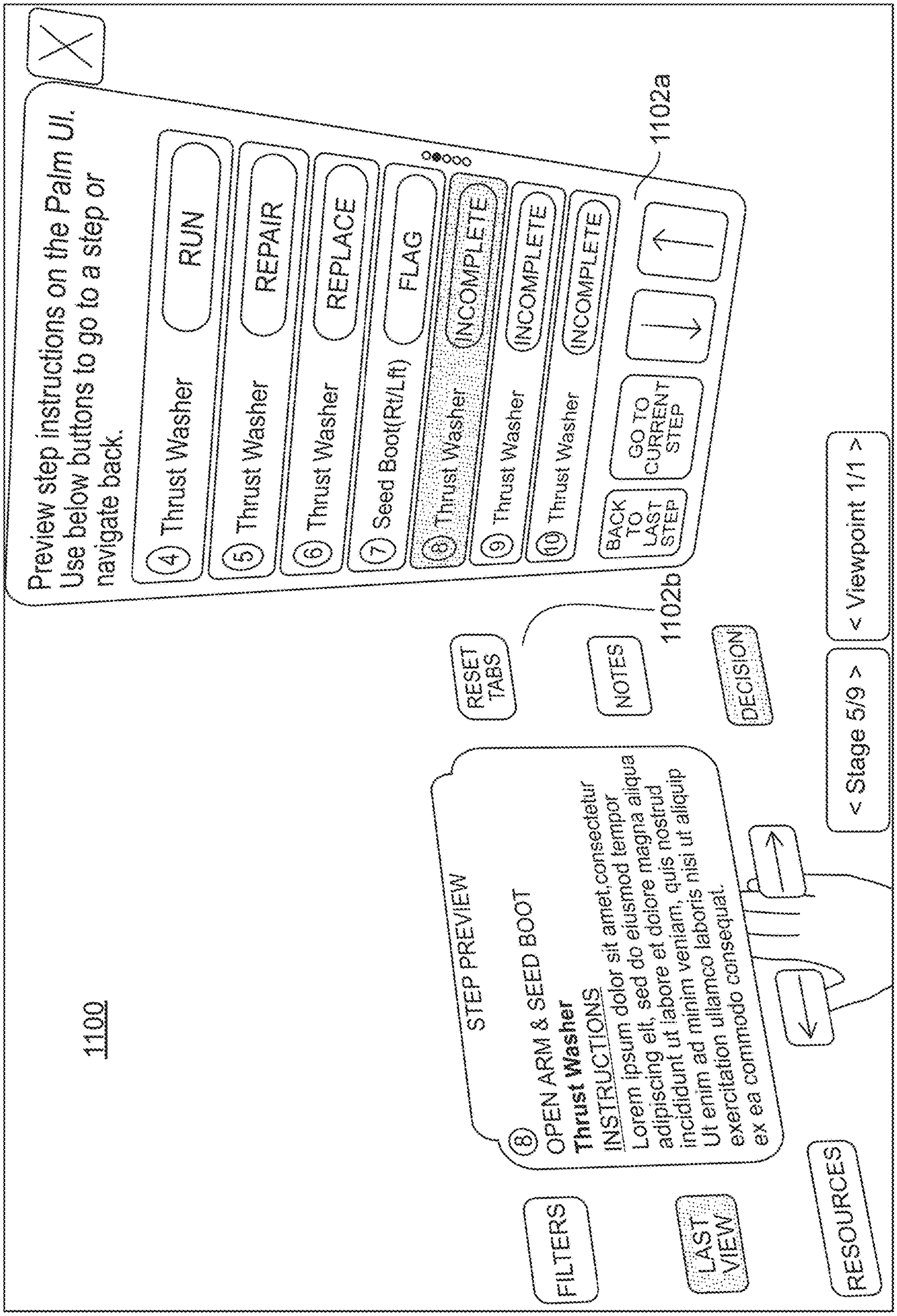
FIG. 11A is a schematic of a user interface showing a list of selectable options for inspection and/or repair.

FIG. 11A is a schematic of a user interface 1100 showing a list of selectable options for inspection and/or repair. The user interface 1100 presents an evaluation for the user to review based on the scanned agricultural equipment (e.g., agricultural machinery 904 of FIG. 9A). The user interface 1100 includes a preview field 1102_a_ where a user can preview the list of step-by-step instructions for repair and/or inspection. The user interface 1100 can also include a decision interface 1102*b* that describes the instructions for inspection and a user can make a decision to complete the step by selecting to run or repair or replace a part. The evaluation presented on the user interface 1100 is from a trained machine learning model (e.g., the trained model 218 of FIG. 2B or 2C) which provides an evaluation (e.g., predictive evaluation) of the agricultural machinery that can include a cause of a fault and/or a predicted maintenance task.

The user preview field 1102*a* and decision interface 1102*b* can be present as a function of extended reality or on a mobile device. In some embodiments, the evaluation includes customized recommendations associated with the fault (e.g., repair the fault). For example, a relevant list of repair tasks, a relevant list of parts to accomplish the repair or maintenance, a step-by-step guidance to perform the recommended maintenance or repair, a predicted cost to repair the fault and run the equipment, a predicted lifespan if the fault is repaired, a predicted replacement cost of the agricultural machine, and/or a predicted sale cost of the agricultural machine. The user can then use a decision function to select whether to run or repair or replace as described in FIG. 11B.

Figure 11B:
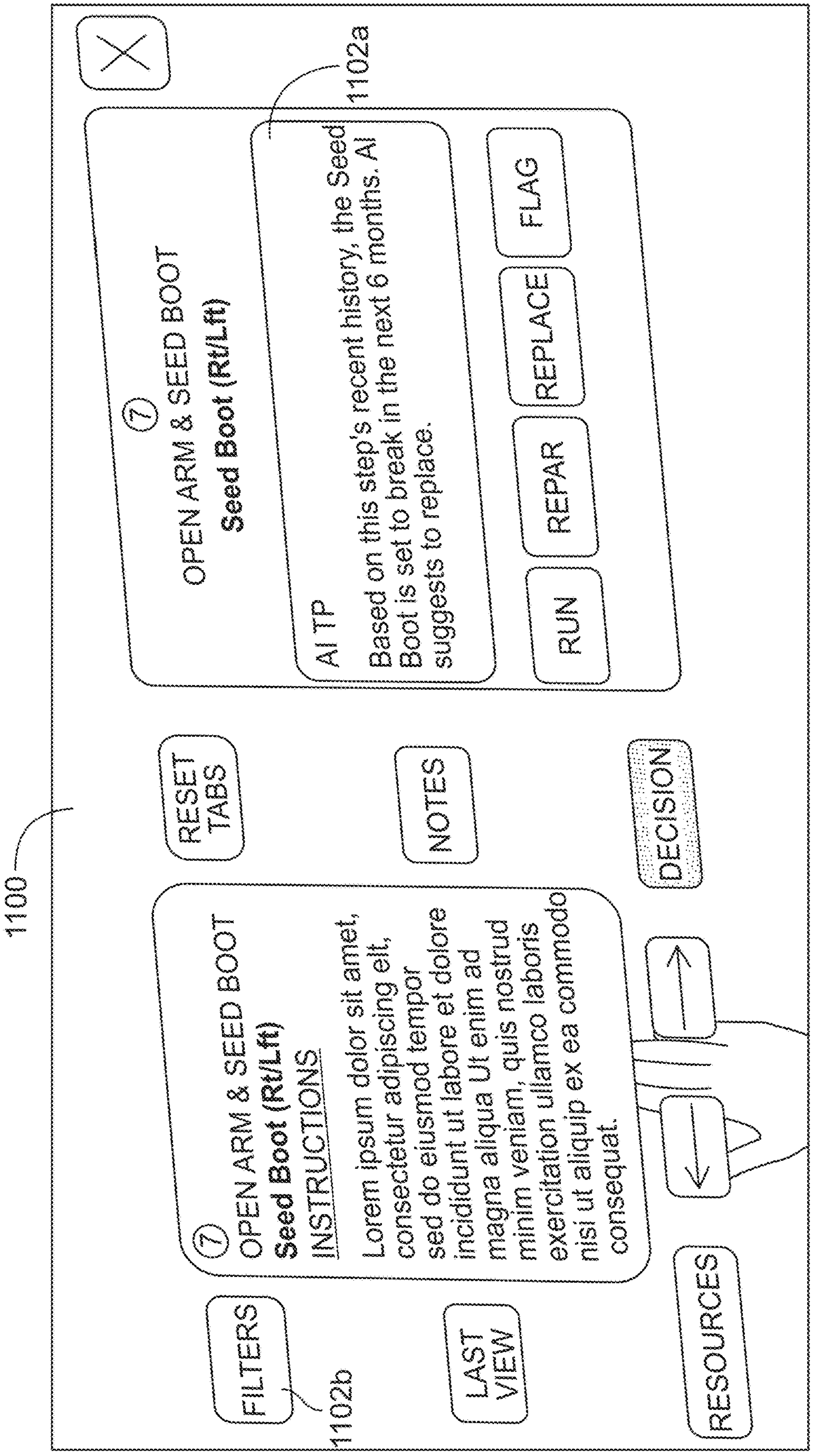
FIG. 11B is a schematic of a user interface showing options during a decision function.

FIG. 11B is a schematic of a user interface 1100 showing options during a decision function. The user interface 1100 is a close-up view of the decision interface 1102*b* which can be presented as extended reality or on a display of a mobile device. In this implementation, a user can preview a selected step of the step-by-step instructions from the preview field 1102*a* for repairing or inspecting a component, in this case, a seed boot. The user can select a decision function from the decision interface 1102*b* to decide whether to run, replace, repair, or flag the issue for a later time. Whichever decision is made will be updated to the input data (e.g., input data 236 of FIG. 2C) associated with the agricultural machine (e.g., agricultural machine 233 of FIG. 2C) as updated repair history (e.g., updated repair history 255 of FIG. 2C).

Figure 12A:
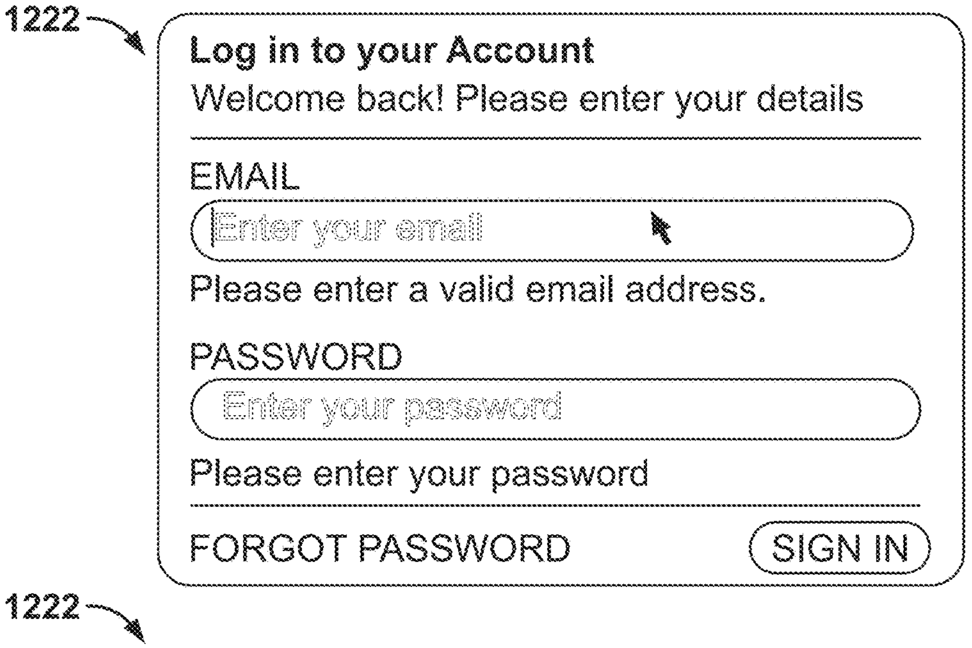
FIGS. 12A-12F are schematics of an example user interface in the form of a computer, laptop, or tablet device for inspecting part of agricultural machinery that is part of a repository as described in connection with FIGS. 6A and 6B.
Figure 12B:
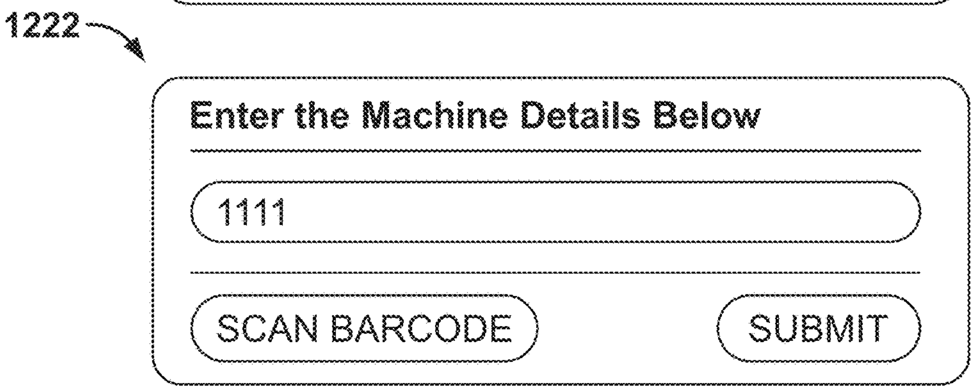

FIGS. 12A-12F are schematics of an example user interface in the form of a computer, laptop, or tablet device for inspecting part of agricultural machinery that is part of a repository as described in connection with FIGS. 6A and 6B. FIG. 12A depicts user interface 1222 with a log-in screen for a user to input credentials to access the repository. FIG. 12B depicts user interface 1222 with a field for a user to input machine details or to use a scanning device (e.g., as described in FIGS. 9A-9B). For example, information such as input data can be retrieved from a database (e.g., database 254 of FIG. 2B) corresponding to a machine, e.g., an agricultural machine.

Figure 12C:
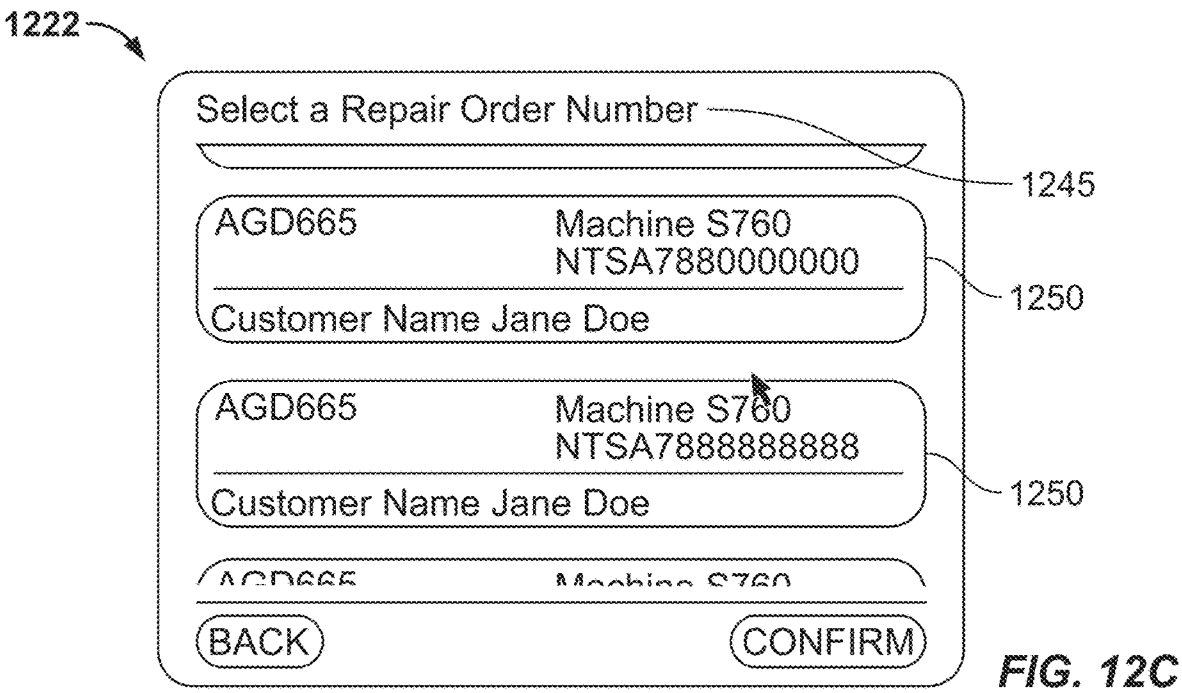

FIG. 12C depicts user interface 1222 with a list of repair orders 1250 within a repository 1245. In some embodiments, instead or in addition to a list of repair orders, the repository 1245 includes a list of machines (e.g., 614*a* and 614*b* of FIGS. 6A and 6B). For instance, the list of machines can include a respective distinguishing feature or identifier of each machine in the repository 1245, such as a fiducial marker (e.g., 232 of FIG. 2B) or a vehicle identification number (VIN) specific to the machinery.

Figure 12D:
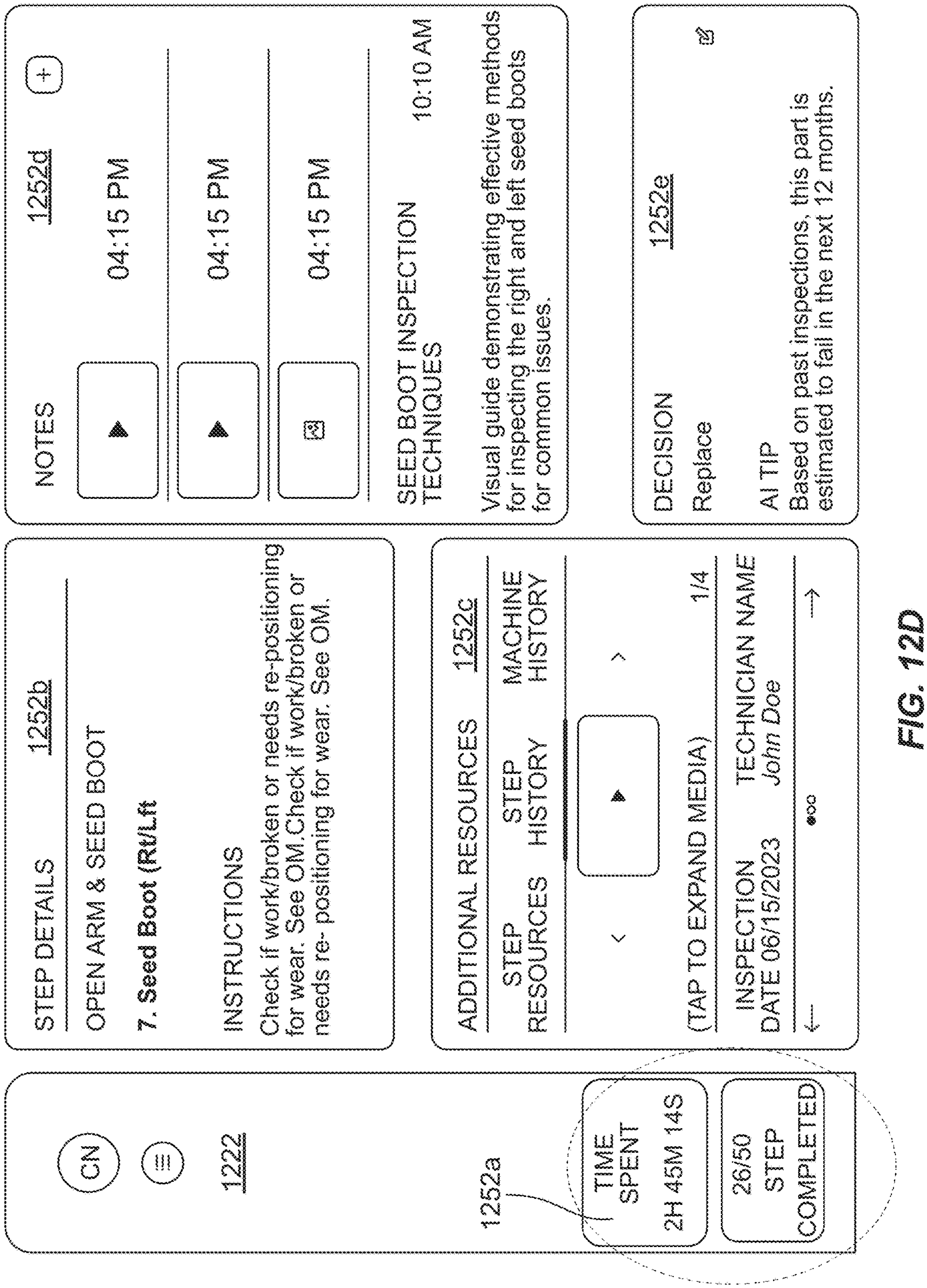

FIG. 12D depicts user interface 1222 showing details about an ongoing inspection of a machine selected by the user as described in connection with FIG. 12C. User interface 1222 depicts details such as the time spent and the step of the repair/inspection under review (1252*a*). User interface 1222 depicts other details such as step details (1252*b*) which includes the component being inspected and instructions for the inspection, additional resources 1252*c* that, for example, can include step resources (e.g., visual guides for completing the step, an explanation of common issues, etc.), step history (e.g., the history of completing or not completing the step, technician performing the step, date of prior performance, etc.), machine history (e.g., attribute information, repair history, etc.); and/or notes 1252*d* which can include and decision details 1252*e* where a user can input a decision about the particular step described on the user interface 1222.

Figure 12E:
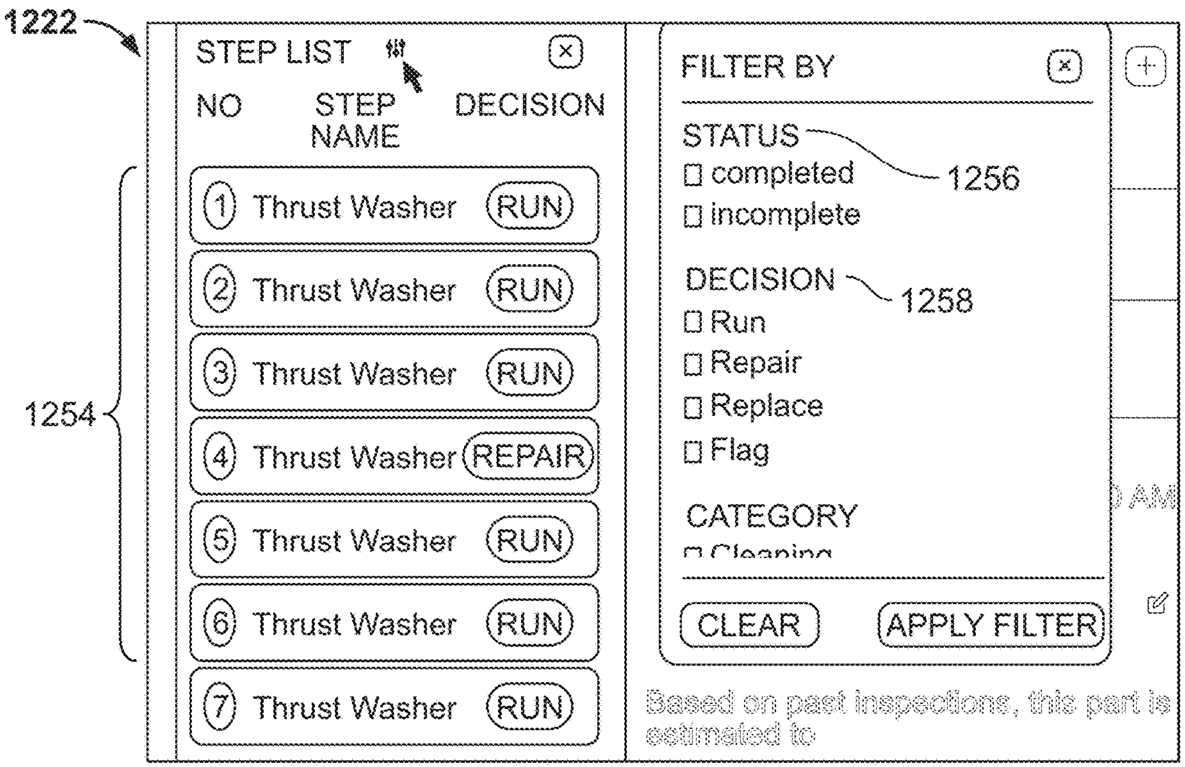
Figure 12F:
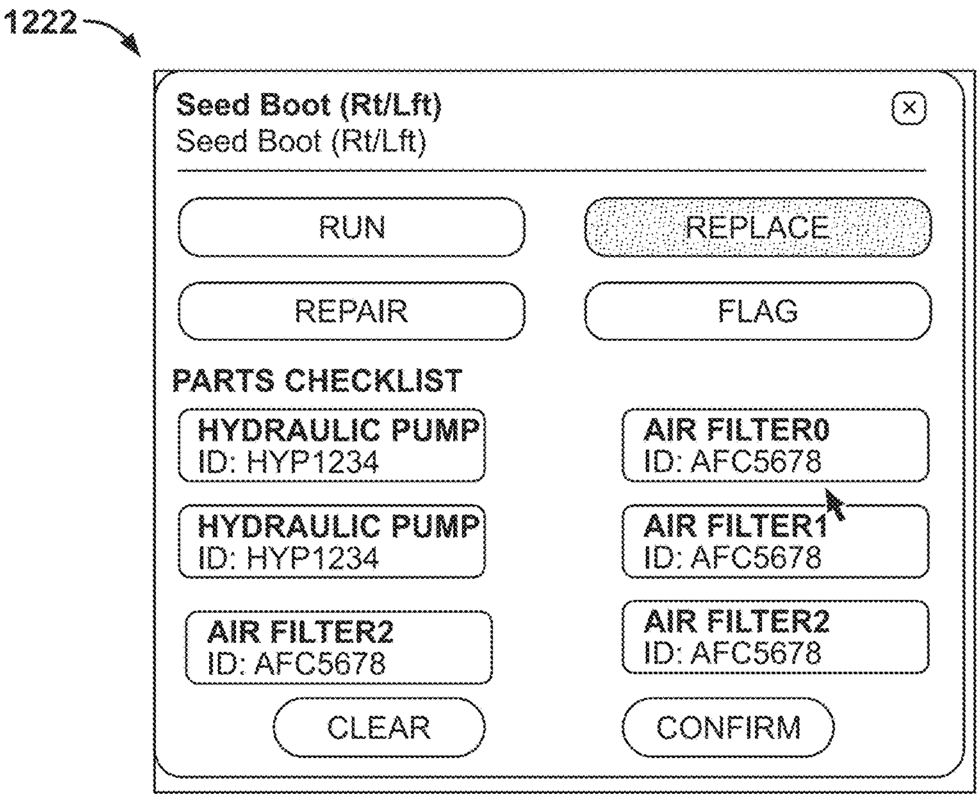

FIG. 12E depicts user interface 1222 showing filtering options for a machine within a repository. In this implementation, a user can filter the steps and history of a machine within a repository. For example, the filter can display a step list 1254, options to filter by status 1256, and/or decision options 1258. FIG. 12F depicts user interface 1222 showing a parts list populated for when a user has decided to repair a part.

Figure 13A:
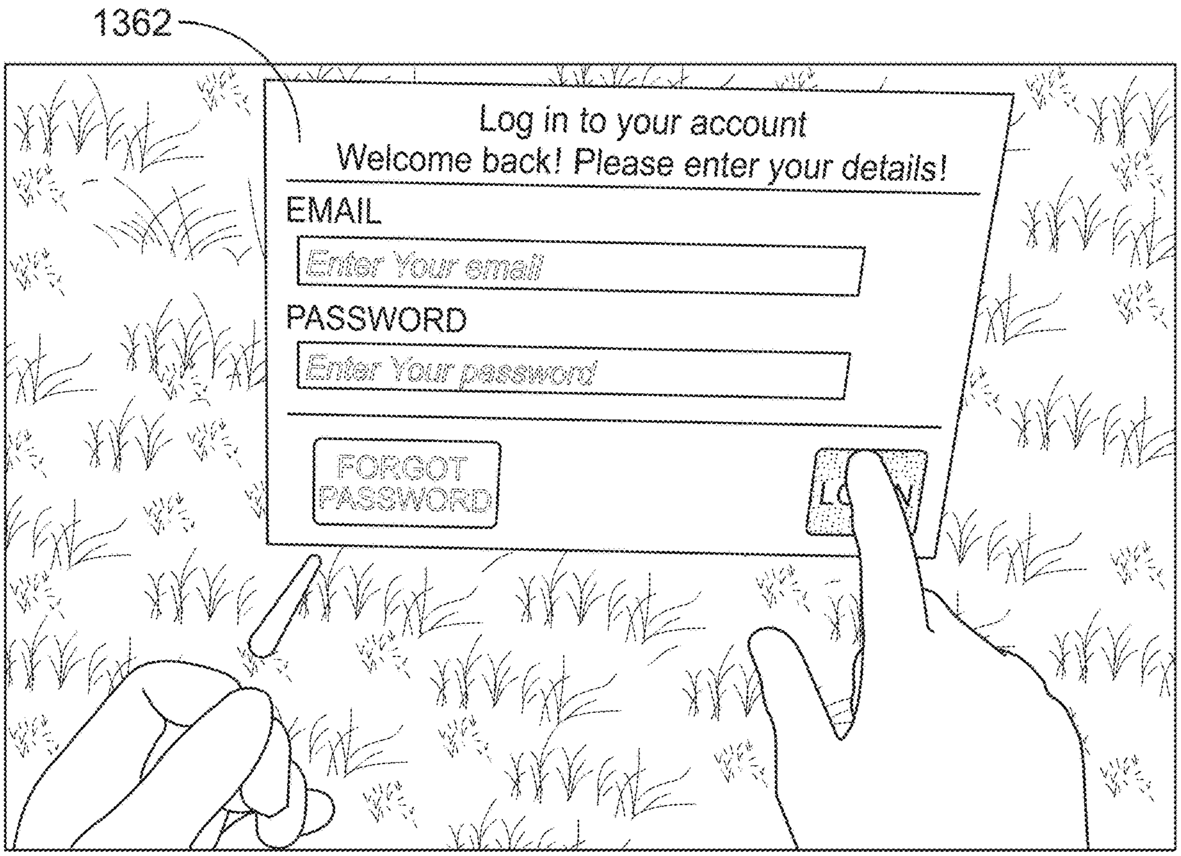
FIGS. 13A-13F are schematics of an example user interface in the form of a wearable device such as extended reality goggles to perform a diagnostic evaluation, repair, or inspection on a machine that is part of a repository as described in connection with FIGS. 6A and 6B.
Figure 13B:
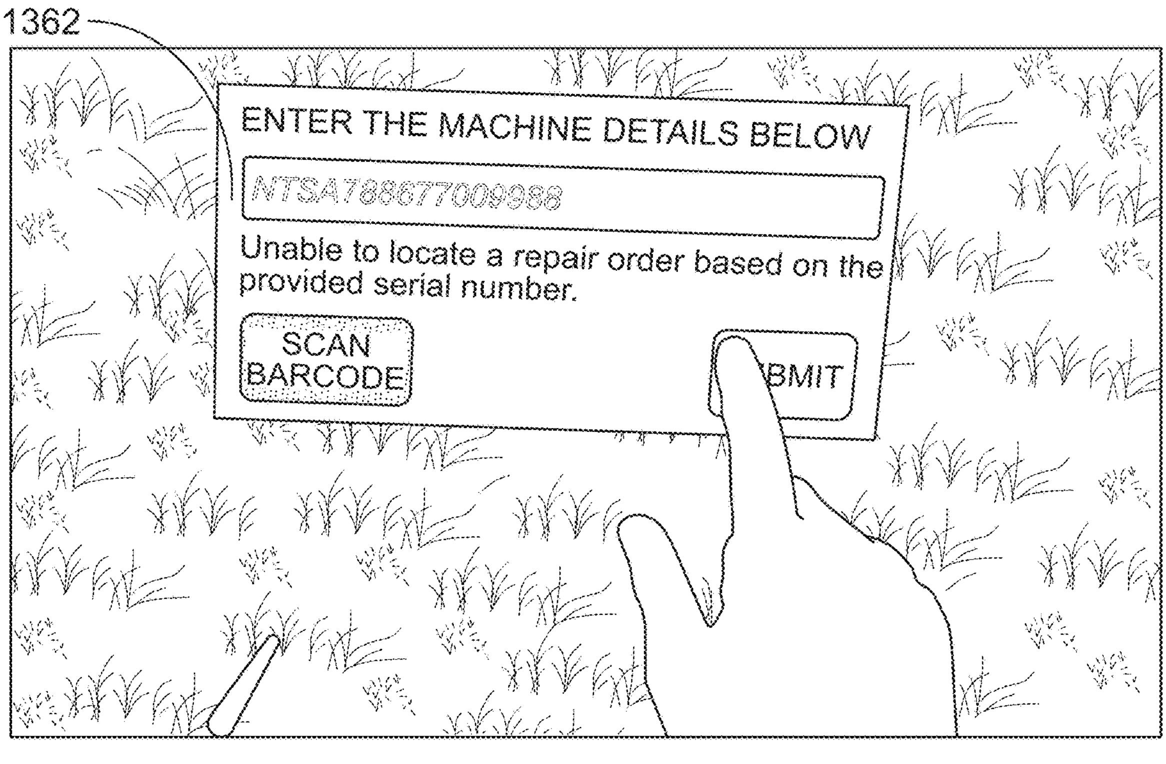

FIGS. 13A-F are schematics of an example user interface in the form of a wearable device such as extended reality goggles (e.g., scanning device 902 of FIG. 9B) to perform a diagnostic evaluation, repair, or inspection on a machine that is part of a repository as described in connection with FIGS. 6A and 6B. FIG. 13A depicts user interface 1362 with a log-in screen for a user to input credentials to access the repository. FIG. 13B depicts user interface 1362 with a field for a user to input machine details or to use a scanning device (e.g., as described in FIGS. 9A-9B).

Figure 13C:
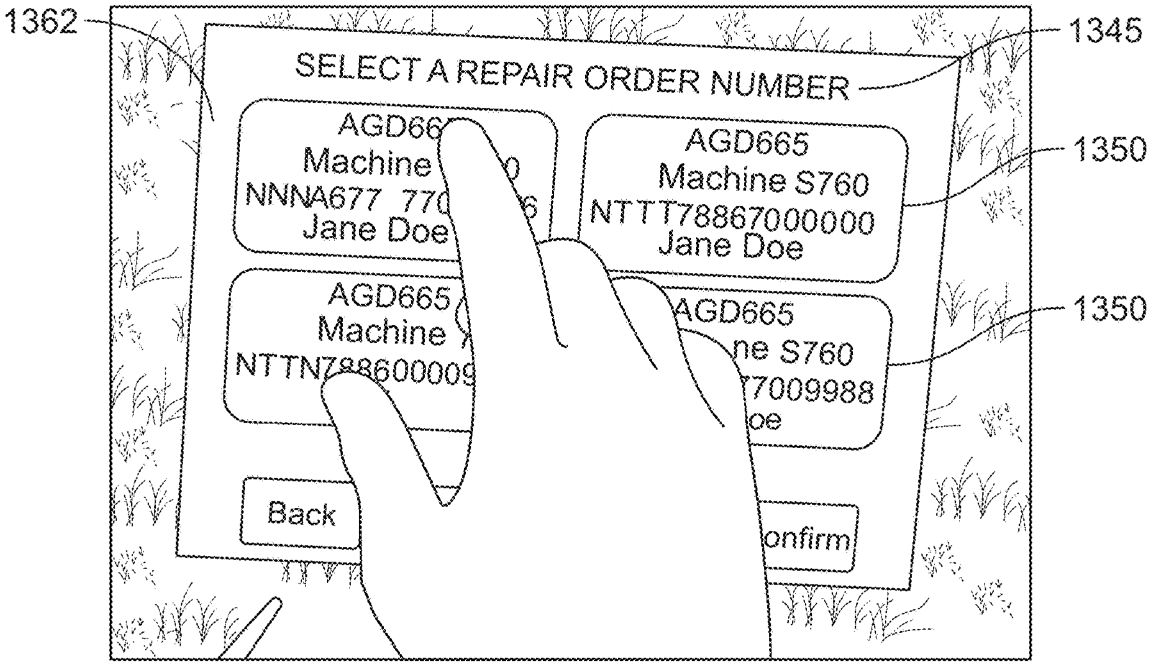
Figure 13D:
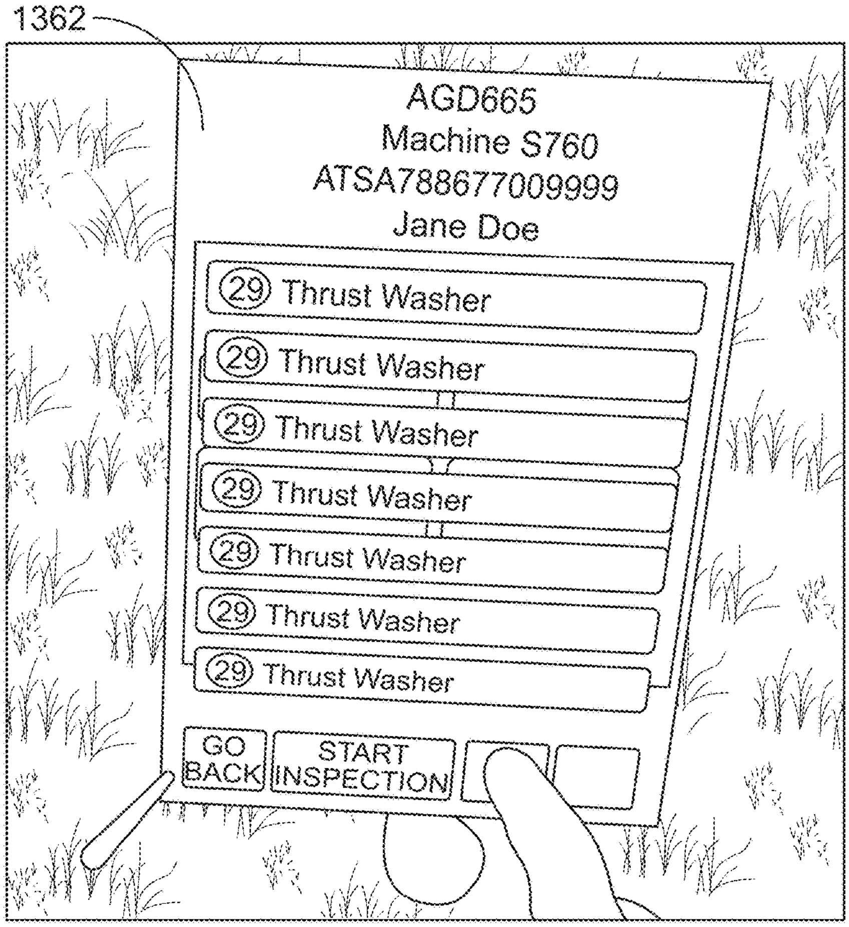

FIG. 13C depicts user interface 1362 with a list of repair orders 1350 within a repository 1345. In some embodiments, instead or in addition to a list of repair orders, the repository 1345 includes a list of machines (e.g., 614*a* and 614*b* of FIGS. 6A and 6B). For instance, the list of machines can include a respective distinguishing feature or identifier of each machine in the repository 1345, such as a fiducial marker (e.g., 232 of FIG. 2B) or a vehicle identification number (VIN) specific to the machinery. FIG. 13D depicts user interface 1362 with a list of inspection items corresponding to the machine selected by a user from the repository 1345 of FIG. 13C.

Figure 13E:
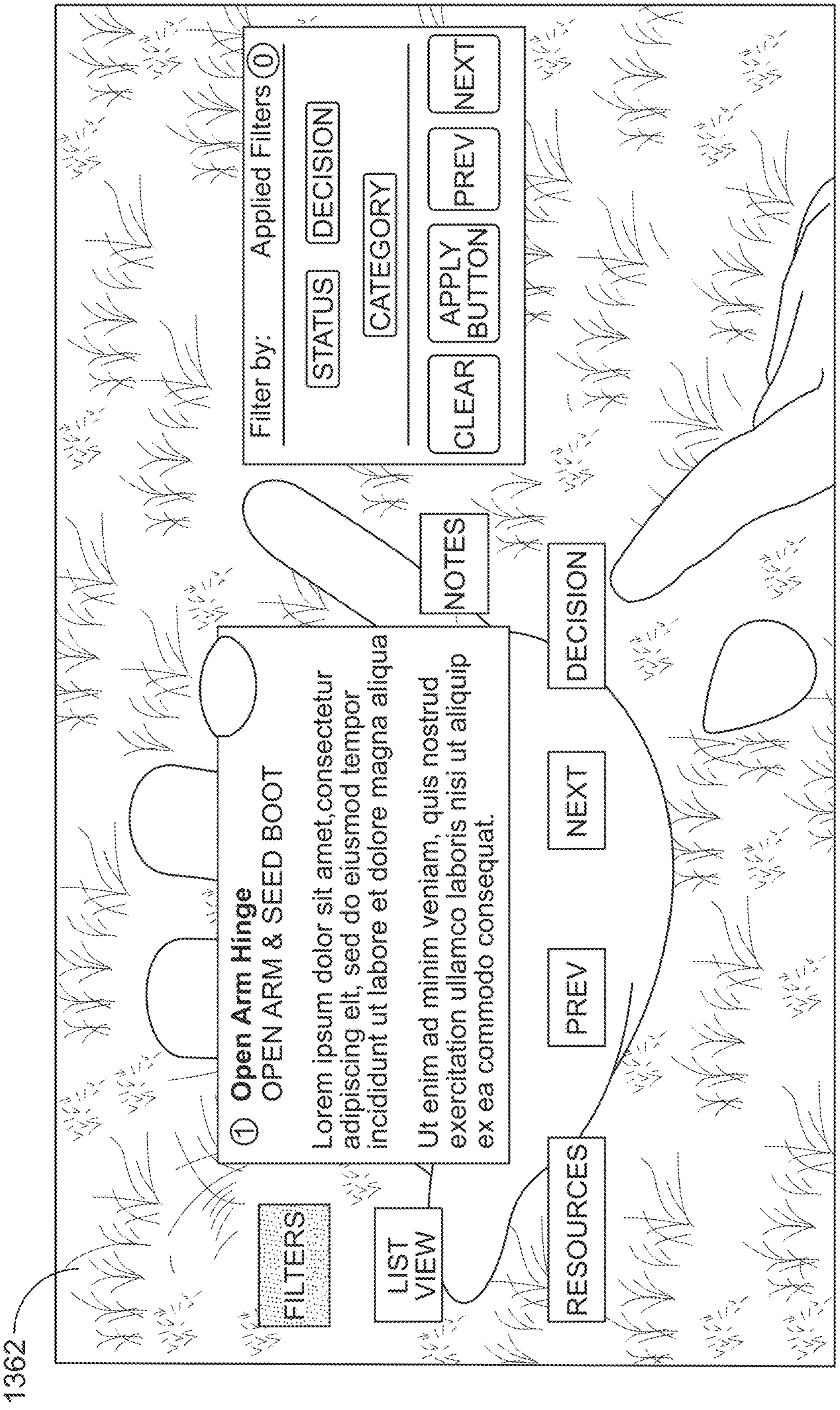
Figure 13F:
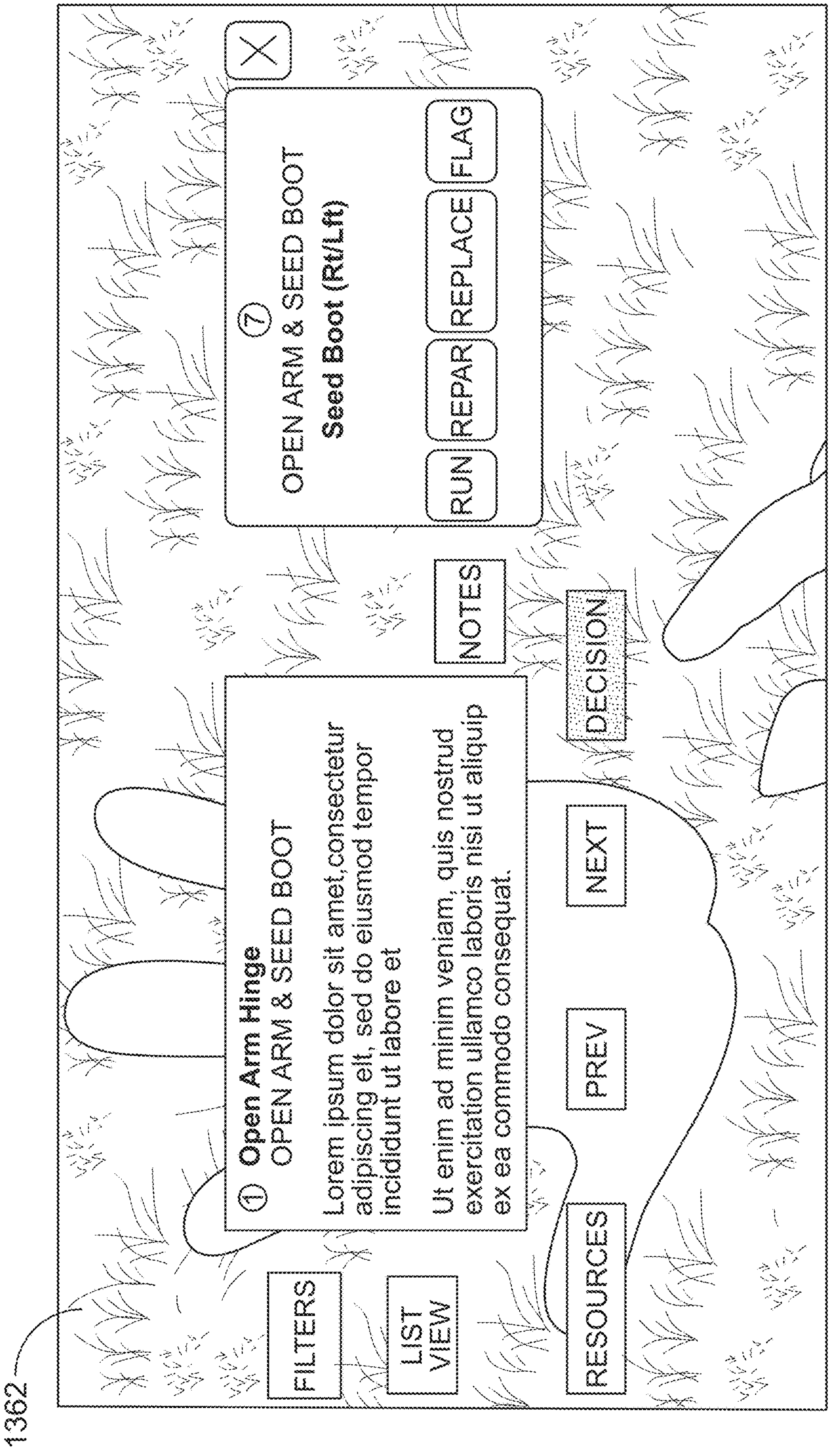

FIG. 13E depicts user interface 1362 showing filtering options for a machine within a repository. In this implementation, a user can filter the steps and history of a machine within a repository. For example, the filter can display options to filter by status, category, and/or decision options as described above in connection with FIG. 12E. FIG. 13F depicts user interface 1362 showing a decision function and the options to run, repair, replace, and flag.

Figure 14:
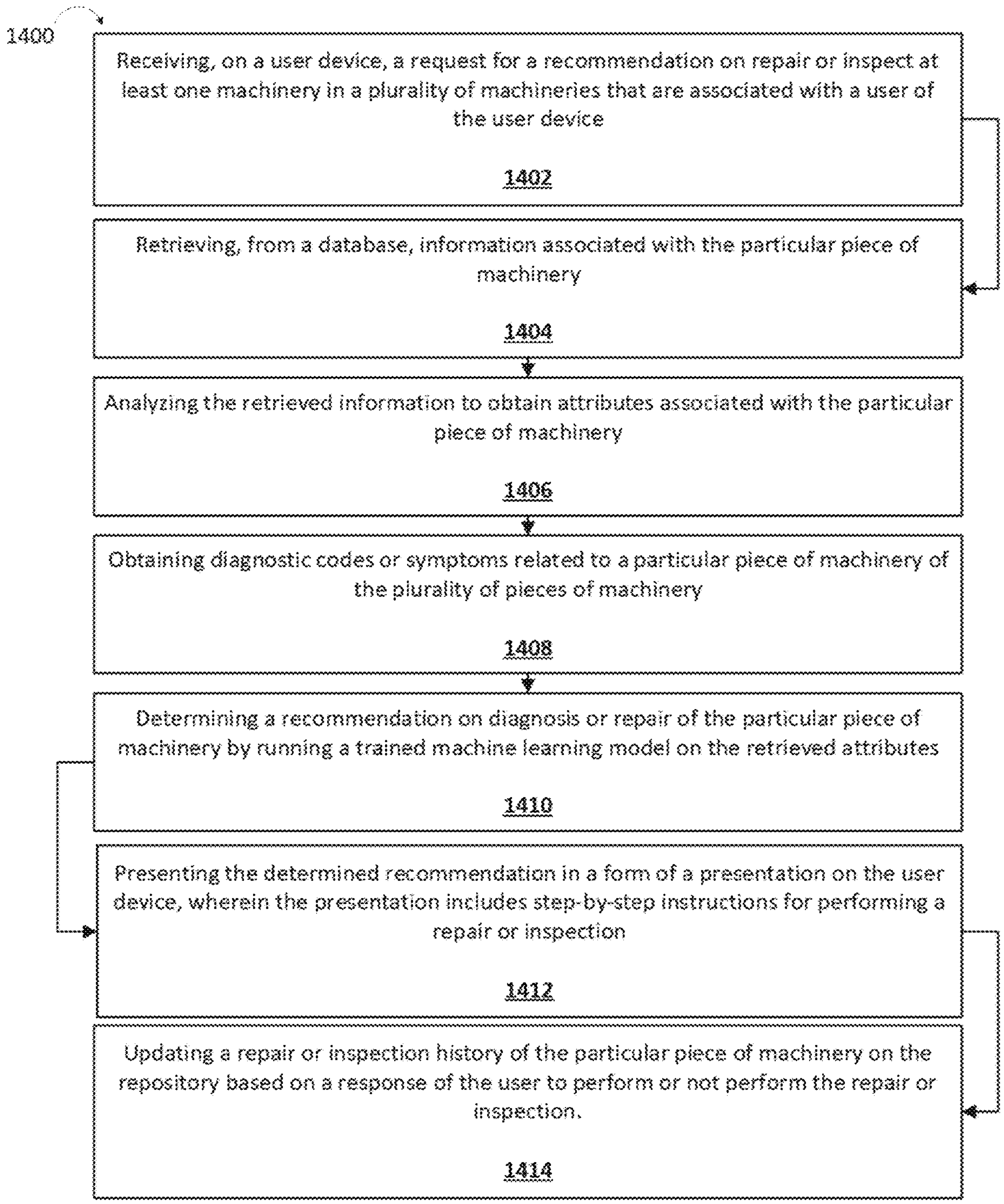
FIG. 14 is a flow chart of an example method for diagnosing and repairing machinery using a repository and a trained machine learning model.

FIG. 14 is a flowchart for an example method 1400 for diagnosing and repairing machinery using a repository and a trained machine learning model. The method 1400 comprises, at 1402, receiving, on a user device, a request for a recommendation on repair or inspect at least one machinery in a plurality of machineries that are associated with a user of the user device.

The example method 1400 comprises, at 1404, retrieving, from a database (e.g., database 207 of FIG. 2), information associated with the particular piece of machinery. The example method 1400 comprises, at 1406, analyzing the retrieved information to obtain attributes associated with the particular piece of machinery.

The example method 1400 comprises, at 1408, obtaining diagnostic codes (e.g., a noise, leak, smell, or observed operation) or symptoms (e.g., a noise, leak, smell, or observed operation) related to a particular piece of machinery of the plurality of pieces of machinery.

The example method 1400 comprises, at 1410, determining a recommendation on diagnosis or repair of the particular piece of machinery by running a trained machine learning model on the retrieved attributes.

The example method 1400 comprises, at 1412, presenting the determined recommendation in a form of a presentation on the user device, wherein the presentation includes step-by-step instructions for performing a repair or inspection. For example, the system can instruct the user to hold the belt in their hand, detect the user's hand's position with respect to the belt, instruct the user to pull the belt, detect the movement of the belt as a result of the user's power enforcement, detect tears and wears or potential weaknesses of the belt as it moves, and provide a recommendation on how to fix those issues, e.g., through another step-by-step set of instructions to replace the belt.

The example method 1400 comprises, at 1414, updating a repair (e.g., as described in connection with FIG. 2C) or inspection history of the particular piece of machinery on the repository based on a response of the user to perform or not perform the repair or inspection.

Figure 15:
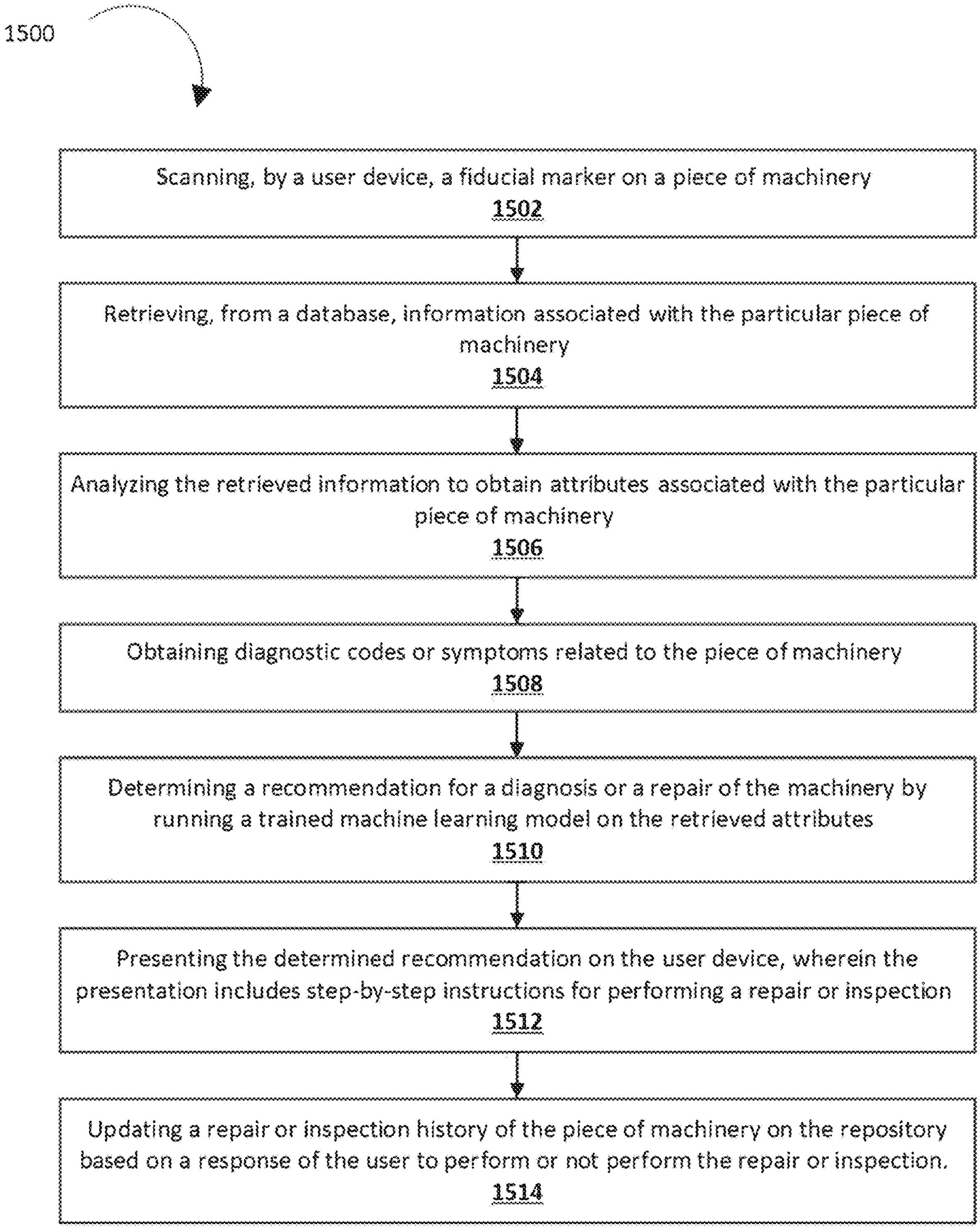
FIG. 15 is a flow chart of an example method for interacting with machinery data using a user device and a trained machine learning model Like reference symbols in the various drawings indicate like elements.

FIG. 15 is a flow chart of an example method for interacting with machinery data using a user device and a trained machine learning model. The method 1500 comprises, at 1502, scanning, by a user device, a fiducial marker on a piece of machinery. The method 1500 comprises, at 1504, retrieving, from a database (e.g., database 207 of FIG. 2), information associated with the particular piece of machinery.

The method 1500 comprises, at 1506, analyzing the retrieved information to obtain attributes associated with the particular piece of machinery. The method 1500 comprises, at 1508, obtaining diagnostic codes (e.g., a reference code corresponding to a part or fault of the machine) or symptoms related to the piece of machinery. The method 1500 comprises, at 1510, determining a recommendation for a diagnosis or a repair of the machinery by running a trained machine learning model on the retrieved attributes.

The method 1500 comprises, at 1512, presenting the determined recommendation on the user device, wherein the presentation includes step-by-step instructions for performing a repair or inspection. The method 1500 comprises, at 1514, updating a repair or inspection history of the piece of machinery on the repository based on a response of the user to perform or not perform the repair or inspection. For example, the system can instruct the user to hold the belt in their hand, detect the user's hand's position with respect to the belt, instruct the user to pull the belt, detect the movement of the belt as a result of the user's power enforcement, detect tears and wears or potential weaknesses of the belt as it moves, and provide a recommendation on how to fix those issues, e.g., through another step-by-step set of instructions to replace the belt.

A number of implementations of the present disclosure have been described. Nevertheless, it will be understood that various modifications may be made without departing from the spirit and scope of the present disclosure. Accordingly, other implementations are within the scope of the following claims.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method performed by one or more computers, the method comprising:

receiving, from a database, input data corresponding to an agricultural machine;

determining, from the input data, a plurality of attributes that each is associated with a respective characteristic or component of the agricultural machine;

determining, by a machine learning model, an evaluation of the agricultural machine by applying a set of parameters of the machine learning model on the plurality of attributes, wherein the evaluation includes a prediction regarding respective repairs or maintenances of one or more components of the agricultural machine; and displaying an extended reality representation of the evaluation on a user interface, the extended reality representation including one or more user interface indicators that each represents performing a respective predicted repair or maintenance of the one or more components of the agricultural machine;

wherein the machine learning model has been trained using a plurality of sets of known attributes that correspond to a plurality of known agricultural machines, and wherein the plurality of sets of known attributes include past repair history, quantity of bushels harvested, variety of crop, and geographical region of use.

2. The method of claim 1, wherein the extended reality representation indicates step-by-step instructions for performing the respective predicted repair or maintenance.

3. The method of claim 1, wherein the method further comprises training the machine learning model; and transforming a plurality of different training data formats to a format that is acceptable for the machine learning model.

4. The method of claim 1, wherein the plurality of attributes include one or more of hours of use, quantity of acreage harvested, make, model, repair history, work order history, quantity of bushels harvested, variety of crop, and geographical region of use.

5. The method of claim 1, wherein the predicted repair or maintenance of the one or more components of the agricultural machine is based on:

one or more attributes selected from hours of use, make, and model; and one or more attributes selected from repair history, quantity of bushels harvested, variety of crop, and geographical region of use.

6. The method of claim 1, wherein the machine learning model comprises at least one of a neural network, a support vector machine, a classifier, a regression model, a clustering model, a decision tree, a random forest model, a genetic algorithm, a Bayesian model, a Gaussian mixture model, a gradient boosting model, or a dimensionality reduction model.

7. The method of claim 1, further comprising generating an evaluation output that comprises one or more of a creation of inspection points on the agricultural machine, a recommendation to run the agricultural machine, a recommendation to replace the agricultural machine, a recommendation to repair the agricultural machine, a prediction of failure probabilities of components on the agricultural machine, a list of parts tailored to the attributes of the agricultural machine, or guidance to support resources, wherein the extended reality representation includes a representation of the evaluation output.

8. The method of claim 7, wherein the inspection points can include information about a probability that a particular component will fail.

9. The method of claim 1, wherein the displaying the extended reality representation of the evaluation output to a user interface comprises a representation of a portion of the agricultural machine that is obscured.

10. A non-transitory computer-readable storage medium coupled to one or more processors and having instructions stored thereon which, when executed by the one or more processors, cause the one or more processors to perform operations, the operations comprising:

receiving, from a database, input data corresponding to an agricultural machine;

determining, from the input data, a plurality of attributes that each is associated with a respective characteristic or component of the agricultural machine;

determining, by a machine learning model, an evaluation of the agricultural machine by applying a set of parameters of the machine learning model on the plurality of attributes, wherein the evaluation includes a prediction regarding respective repairs or maintenances of one or more components of the agricultural machine; and displaying an extended reality representation of the evaluation on a user interface, the extended reality representation including one or more user interface indicators that each represents performing a respective predicted repair or maintenance of the one or more components of the agricultural machine, wherein the machine learning model has been trained using a plurality of sets of known attributes that correspond to a plurality of known agricultural machines, and wherein the plurality of sets of known attributes include past repair history, quantity of bushels harvested, variety of crop, and geographical region of use.

11. The medium of claim 10, wherein the extended reality representation indicates step-by-step instructions for performing the respective predicted repair or maintenance.

12. The medium of claim 10, wherein the operations further comprise training the machine learning model; and transforming a plurality of different training data formats to a format that is acceptable for the machine learning model.

13. The medium of claim 10, wherein the plurality of attributes include one or more of hours of use, quantity of acreage harvested, make, model, repair history, work order history, quantity of bushels harvested, variety of crop, and geographical region of use.

14. The medium of claim 10, wherein the predicted repair or maintenance of the one or more components of the agricultural machine is based on:

one or more attributes selected from hours of use, make, and model; and one or more attributes selected from repair history, quantity of bushels harvested, variety of crop, and geographical region of use.

15. The medium of claim 10, further comprising generating an evaluation output that comprises one or more of a creation of inspection points on the agricultural machine, a recommendation to run the agricultural machine, a recommendation to replace the agricultural machine, a recommendation to repair the agricultural machine, a prediction of failure probabilities of components on the agricultural machine, a list of parts tailored to the attributes of the agricultural machine, or guidance to support resources, wherein the extended reality representation includes a representation of the evaluation output.

16. The medium of claim 15, wherein the inspection points can include information about the probability that a particular component will fail.

17. A system, comprising:

a computing device; and a non-transitory computer-readable storage device coupled to the computing device and having instructions stored thereon which, when executed by the computing device, cause the computing device to perform operations, the operations comprising:

receiving, from a database, input data corresponding to an agricultural machine;

determining, from the input data, a plurality of attributes that each is associated with a respective characteristic or component of the agricultural machine;

determining, by a machine learning model, an evaluation of the agricultural machine by applying a set of parameters of the machine learning model on the plurality of attributes, wherein the evaluation includes a prediction regarding respective repairs or maintenances of one or more components of the agricultural machine; and displaying an extended reality representation of the evaluation on a user interface, the extended reality representation including one or more user interface indicators that each represents performing a respective predicted repair or maintenance of the one or more components of the agricultural machine, wherein the machine learning model has been trained using a plurality of sets of known attributes that correspond to a plurality of known agricultural machines, and wherein the plurality of sets of known attributes include past repair history, quantity of bushels harvested, variety of crop, and geographical region of use.

18. The system of claim 17, wherein the extended reality representation indicates step-by-step instructions for performing the respective predicted repair or maintenance.

* * * * *